United States Patent
Seki

(10) Patent No.: US 9,525,579 B2
(45) Date of Patent: Dec. 20, 2016

(54) FFT CIRCUIT

(71) Applicant: NEC Corporation, Tokyo (JP)

(72) Inventor: Katsutoshi Seki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 165 days.

(21) Appl. No.: 14/414,503

(22) PCT Filed: Jul. 17, 2013

(86) PCT No.: PCT/JP2013/004351
§ 371 (c)(1),
(2) Date: Jan. 13, 2015

(87) PCT Pub. No.: WO2014/013726
PCT Pub. Date: Jan. 23, 2014

(65) Prior Publication Data
US 2015/0195114 A1 Jul. 9, 2015

(30) Foreign Application Priority Data
Jul. 18, 2012 (JP) ................. 2012-159353

(51) Int. Cl.
*G06F 17/14* (2006.01)
*H04L 27/26* (2006.01)

(52) U.S. Cl.
CPC ........... *H04L 27/265* (2013.01); *G06F 17/142* (2013.01)

(58) Field of Classification Search
CPC ............................ H04L 27/265; G06F 17/142
(Continued)

(56) References Cited

U.S. PATENT DOCUMENTS 6,061,705 A * 5/2000 Hellberg ............... G06F 17/142
708/404
6,081,821 A * 6/2000 Hopkinson ........... G06F 17/142
708/404

(Continued)

FOREIGN PATENT DOCUMENTS

JP 2008-506191 2/2008

OTHER PUBLICATIONS

Yun-Nan Chang, "An efficient VLSI architecture for normal I/O order pipeline FFT design", IEEE Transactions on Circuits and Systems II, Express Briefs, vol. 55, No. 12, pp. 1234-1238, Dec. 2008.

(Continued)

*Primary Examiner* — Tan V. Mai
(74) *Attorney, Agent, or Firm* — Young & Thompson

(57) ABSTRACT

In one embodiment, an FFT circuit (1) includes a pipeline in which L number of butterfly operational elements each having Single-path Delay Feedback, SDF, architecture are connected with each other. Each of LHF number of butterfly PEs (10), corresponding to a first stage to an LHFth stage, is configured to rearrange output data order such that, in units of $N/(2^{S-1})$ pieces of output data starting from head output data whose Data Flow Graph, DFG, index i is "0", intermediate result data $G_S(i)$ whose $b_S(i)$ is 1 is output after intermediate result data $G_S(i)$ whose $b_S(i)$ is 0 in the $N/(2^{S-1})$ pieces of the output data, where N represents the number of FFT points, S represents an integer indicating a stage number, and $b_S(i)$ represents the Sth bit from the least significant bit in binary representation of the DFG index i.

20 Claims, 17 Drawing Sheets

(58) Field of Classification Search
USPC .......................................... 708/404, 408–409
See application file for complete search history.

(56) References Cited

U.S. PATENT DOCUMENTS

| | | | | |
|---|---|---|---|---|
| 6,098,088 | A * | 8/2000 | He | G06F 17/142 708/406 |
| 8,166,088 | B2 * | 4/2012 | Lee | G06F 17/142 708/404 |
| 2003/0225805 | A1 * | 12/2003 | Nash | G06F 17/142 708/403 |
| 2004/0059766 | A1 * | 3/2004 | Yeh | G06F 17/142 708/406 |
| 2006/0010188 | A1 | 1/2006 | Solomon et al. | |
| 2009/0013021 | A1 * | 1/2009 | Jhang | G01S 19/254 708/404 |
| 2010/0011043 | A1 * | 1/2010 | Pu | G06F 17/142 708/404 |

OTHER PUBLICATIONS

International Search Report PCT/JP2013/004351 dated Sep. 17, 2013.

\* cited by examiner

| COUNTER VALUE | BIN1 | BIN2 DEC | BIN2 BIN | BOUT1/SIN1 | BOUT2/SIN2 | SOUT2 DEC | SOUT2 BIN | SOUT1 | SELECTOR 15 | SELECTOR 142 |
|---|---|---|---|---|---|---|---|---|---|---|
| 0 | — | X(0) | X(0000) | X(0) | — | — | — | — | 0 | A |
| 1 | — | X(1) | X(0001) | X(1) | — | — | — | X(0) | 0 | A |
| 2 | — | X(2) | X(0010) | X(2) | — | — | — | X(1) | 0 | A |
| 3 | — | X(3) | X(0011) | X(3) | — | — | — | X(2) | 0 | A |
| 4 | — | X(4) | X(0100) | X(4) | — | — | — | X(3) | 0 | A |
| 5 | — | X(5) | X(0101) | X(5) | — | — | — | X(4) | 0 | A |
| 6 | — | X(6) | X(0110) | X(6) | — | — | — | X(5) | 0 | A |
| 7 | — | X(7) | X(0111) | X(7) | — | — | — | X(6) | 0 | A |
| 8 | X(0) | X(8) | X(1000) | G1(8) | G1(0) | G1(0) | G1(0000) | X(7) | 0 | A |
| 9 | X(1) | X(9) | X(1001) | G1(9) | G1(1) | G1(8) | G1(1000) | G1(1) | 1 | B |
| 10 | X(2) | X(10) | X(1010) | G1(10) | G1(2) | G1(2) | G1(0010) | G1(9) | 1 | A |
| 11 | X(3) | X(11) | X(1011) | G1(11) | G1(3) | G1(10) | G1(1010) | G1(3) | 1 | B |
| 12 | X(4) | X(12) | X(1100) | G1(12) | G1(4) | G1(4) | G1(0100) | G1(11) | 1 | A |
| 13 | X(5) | X(13) | X(1101) | G1(13) | G1(5) | G1(12) | G1(1100) | G1(5) | 1 | B |
| 14 | X(6) | X(14) | X(1110) | G1(14) | G1(6) | G1(6) | G1(0110) | G1(13) | 1 | A |
| 15 | X(7) | X(15) | X(1111) | G1(15) | G1(7) | G1(14) | G1(1110) | G1(7) | 1 | B |
| 0 | G1(1) | — | — | — | G1(1) | G1(1) | G1(0001) | G1(15) | 0 | A |
| 1 | G1(9) | — | — | — | G1(9) | G1(9) | G1(1001) | — | 0 | A |
| 2 | G1(3) | — | — | — | G1(3) | G1(3) | G1(0011) | — | 0 | A |
| 3 | G1(11) | — | — | — | G1(11) | G1(11) | G1(1011) | — | 0 | A |

Fig. 4A

| COUNTER VALUE | BIN1 | BIN2 | | BOUT2 /SIN2 | BOUT1 /SIN1 | SOUT2 | | SOUT1 | SELECTOR 115 | SELECTOR 142 |
| --- | --- | --- | --- | --- | --- | --- | --- | --- | --- | --- |
| | | DEC. | BIN. | | | DEC. | BIN. | | | |
| 0 | G1(5) | - | - | G1(5) | - | G1(5) | G1(0101) | - | 0 | A |
| 1 | G1(13) | - | - | G1(13) | - | G1(13) | G1(1101) | - | 0 | A |
| 2 | G1(7) | - | - | G1(7) | - | G1(7) | G1(0111) | - | 0 | A |
| 3 | G1(15) | - | - | G1(15) | - | G1(15) | G1(1111) | - | 0 | A |

Fig. 4B

| COUNTER VALUE | BIN1 | BIN2 DEC. | BIN2 BIN. | BOUT2/SIN2 | BOUT1/SIN1 | SOUT2 DEC. | SOUT2 BIN. | SOUT1 | SELECTOR 115 | SELECTOR 142 |
|---|---|---|---|---|---|---|---|---|---|---|
| 0 | — | G1(0) | G1(0000) | — | G1(0) | — | — | — | 0 | A |
| 1 | — | G1(8) | G1(1000) | — | G1(8) | — | — | — | 0 | A |
| 2 | — | G1(2) | G1(0010) | — | G1(2) | — | — | — | 0 | A |
| 3 | — | G1(10) | G1(1010) | — | G1(10) | — | — | — | 0 | A |
| 4 | G1(0) | G1(4) | G1(0100) | G2(0) | G2(4) | — | — | G1(0) | 1 | A |
| 5 | G1(8) | G1(12) | G1(1100) | G2(8) | G2(12) | — | — | G1(8) | 1 | A |
| 6 | G1(2) | G1(6) | G1(0110) | G2(2) | G2(6) | — | — | G1(2) | 1 | A |
| 7 | G1(10) | G1(14) | G1(1110) | G2(10) | G2(14) | — | — | G1(10) | 1 | A |
| 8 | G2(0) | G1(1) | G1(0001) | G2(2) | G2(1) | G2(0) | G2(0000) | G2(2) | 0 | B |
| 9 | G2(8) | G1(9) | G1(1001) | G2(10) | G2(9) | G2(8) | G2(1000) | G2(10) | 0 | B |
| 10 | G2(2) | G1(3) | G1(0011) | G2(6) | G2(3) | G2(4) | G2(0100) | G2(6) | 0 | A |
| 11 | G2(10) | G1(11) | G1(1011) | G2(14) | G2(11) | G2(12) | G2(1100) | G2(14) | 0 | A |
| 12 | G1(1) | G1(5) | G1(0101) | G2(1) | G2(5) | G2(2) | G2(0010) | G1(1) | 0 | A |
| 13 | G1(9) | G1(13) | G1(1101) | G2(9) | G2(13) | G2(10) | G2(1010) | G1(9) | 1 | A |
| 14 | G1(3) | G1(7) | G1(0111) | G2(3) | G2(7) | G2(6) | G2(0110) | G1(3) | 1 | B |
| 15 | G1(11) | G1(15) | G1(1111) | G2(11) | G2(15) | G2(14) | G2(1110) | G1(11) | 1 | B |
| 0 | G2(3) | — | — | G2(3) | — | G2(1) | G2(0001) | G2(3) | 0 | B |
| 1 | G2(11) | — | — | G2(11) | — | G2(9) | G2(1001) | G2(11) | 0 | A |
| 2 | G2(7) | — | — | G2(7) | — | G2(5) | G2(0101) | G2(7) | 0 | A |
| 3 | G2(15) | — | — | G2(15) | — | G2(13) | G2(1101) | G2(15) | 0 | A |

Fig. 5

| COUNTER VALUE | IN1 | IN2 DEC. | IN2 BIN. | OUT2 DEC. | OUT2 BIN. | OUT1 | SELECTOR 155 |
|---|---|---|---|---|---|---|---|
| 0 | – | G2(0) | G2(0000) | – | – | G2(0) | 0 |
| 1 | – | G2(8) | G2(1000) | – | – | G2(8) | 0 |
| 2 | – | G2(4) | G2(0100) | – | – | G2(4) | 0 |
| 3 | – | G2(12) | G2(1100) | – | – | G2(12) | 0 |
| 4 | G2(0) | G2(2) | G2(0010) | G3(0) | G3(0000) | G3(2) | 1 |
| 5 | G2(8) | G2(10) | G2(1010) | G3(8) | G3(1000) | G3(10) | 1 |
| 6 | G2(4) | G2(6) | G2(0110) | G3(4) | G3(0100) | G3(6) | 1 |
| 7 | G2(12) | G2(14) | G2(1110) | G3(12) | G3(1100) | G3(14) | 1 |
| 8 | G3(2) | G2(1) | G2(0001) | G3(2) | G3(0010) | G2(1) | 0 |
| 9 | G3(10) | G2(9) | G2(1001) | G3(10) | G3(1010) | G2(9) | 0 |
| 10 | G3(6) | G2(5) | G2(0101) | G3(6) | G3(0110) | G2(5) | 0 |
| 11 | G3(14) | G2(13) | G2(1101) | G3(14) | G3(1110) | G2(13) | 0 |
| 12 | G2(1) | G2(3) | G2(0011) | G3(1) | G3(0001) | G3(3) | 1 |
| 13 | G2(9) | G2(11) | G2(1011) | G3(9) | G3(1001) | G3(11) | 1 |
| 14 | G2(5) | G2(7) | G2(0111) | G3(5) | G3(0101) | G3(7) | 1 |
| 15 | G2(13) | G2(15) | G2(1111) | G3(13) | G3(1101) | G3(15) | 1 |
| 0 | G3(3) | – | – | G3(3) | G3(0011) | – | 0 |
| 1 | G3(11) | – | – | G3(11) | G3(1011) | – | 0 |
| 2 | G3(7) | – | – | G3(7) | G3(0111) | – | 0 |
| 3 | G3(15) | – | – | G3(15) | G3(1111) | – | 0 |

| COUNTER VALUE C DEC. | BIN. | IN1 | IN2 | OUT2 | OUT1 | SELECTOR 815 |
|---|---|---|---|---|---|---|
| 0 | 0000 | – | G1(0) | – | G1(0) | 0 |
| 1 | 0001 | – | G1(1) | – | G1(1) | 0 |
| 2 | 0010 | – | G1(2) | – | G1(2) | 0 |
| 3 | 0011 | – | G1(3) | – | G1(3) | 0 |
| 4 | 0100 | G1(0) | G1(4) | G2(0) | G2(4) | 1 |
| 5 | 0101 | G1(1) | G1(5) | G2(1) | G2(5) | 1 |
| 6 | 0110 | G1(2) | G1(6) | G2(2) | G2(6) | 1 |
| 7 | 0111 | G1(3) | G1(7) | G2(3) | G2(7) | 1 |
| 8 | 1000 | G2(4) | G1(8) | G2(4) | G1(8) | 0 |
| 9 | 1001 | G2(5) | G1(9) | G2(5) | G1(9) | 0 |
| 10 | 1010 | G2(6) | G1(10) | G2(6) | G1(10) | 0 |
| 11 | 1011 | G2(7) | G1(11) | G2(7) | G1(11) | 0 |
| 12 | 1100 | G1(8) | G1(12) | G2(8) | G2(12) | 1 |
| 13 | 1101 | G1(9) | G1(13) | G2(9) | G2(13) | 1 |
| 14 | 1110 | G1(10) | G1(14) | G2(10) | G2(14) | 1 |
| 15 | 1111 | G1(11) | G1(15) | G2(11) | G2(15) | 1 |
| 0 | 0000 | G2(12) | – | G2(12) | – | 0 |
| 1 | 0001 | G2(13) | – | G2(13) | – | 0 |
| 2 | 0010 | G2(14) | – | G2(14) | – | 0 |
| 3 | 0010 | G2(15) | – | G2(15) | – | 0 |

Fig. 14

FFT CIRCUIT

TECHNICAL FIELD

The present invention relates to a pipeline processing circuit which performs Fast Fourier Transform (FFT).

BACKGROUND ART

FFT is an algorithm which is widely used in a signal processing field. The FFT is, for example, used to extract a complex symbol sequence from a received Orthogonal Frequency Division Multiplexing) signal in an OFDM receiver (e.g., a communication terminal of a Long Term Evolution (LTE) system, a wireless Local Area Network (LAN) device and a digital television broadcast receiver). N-point Discrete Fourier Transform (DFT) is represented by following formulae (1) and (2), where X(n) is referred to as a time domain sequence, Y(k) is referred to as a frequency domain sequence and $W^{nk}$ is referred to as a twiddle factor.

$$Y(k) = \sum_{n=0}^{N-1} X(n) W^{nk} \quad k = 0, \ldots, N-1 \quad (1)$$

$$W^{nk} = \exp\left(-j\frac{2\pi nk}{N}\right) \quad (2)$$

A feature of the FFT algorithm is to decompose N-point DFT into a plurality of FFTs of radix points using the periodicity of the twiddle factor $W^{nk}$. Consequently, the FFT algorithm can significantly reduce an operation amount compared to directly calculating the DFT represented by formulae (1) and (2). The FFT algorithm is a widely known algorithm, and is described in detail in, for example, "Digital Signal Processing: Principles, Algorithms and Applications", John G. Proakis, Dimitris K Manolakis, Prentice-Hall (1996). Hence, detailed explanation of the FFT algorithm will be omitted.

The FFT algorithm includes various variations depending on (a) a radix (e.g., Radix-2 or Radix4), (b) decimation in frequency (DIF) or decimation in time (DIT) and (c) a shape of a data flow graph (DFG). Hereinafter, Radix-2 DIF FFT will be described as an example. FIG. 9 illustrates a basic flow graph of a butterfly operation of Radix-2 DIF FFT. FIG. 10 illustrates a data flow graph of 16 point (N=2⁴=16) Radix-2 DIF FFT. FFT can be implemented by a combination of butterfly operations illustrated in FIG. 9, FFT which performs L stages of N/2 butterfly operations, where L=log₂N. As illustrated in FIG. 10, in the case of the Radix-2 DIF FFT, when an input data sequence (i.e., a time domain sequence) is arranged in natural order, an output data sequence (i.e., a frequency domain sequence) is in bit-reversed order. That is, frequency domain data output at a DFG index i is Y ($br_L(i)$). A DFG index indicates order of a data output in a data flow graph. Note that, $br_L(i)$ is a natural number obtained by bit-inverting a binary representation of an L bit length of a natural number i so as to switch between a MSB (Most significant bit) and a LSB (Least Significant Bit) thereof. For example, when i=13 (decimal representation), a binary representation of a four-bit length of 13 is "1101", and then a binary representation of $br_4(13)$ is "1011" and a decimal representation of $br_4(13)$ is "11". Further, a binary representation of $br_5(13)$ is "10110", and a decimal representation of $br_5(13)$ is "22".

Further, Single-path Delay Feedback (SDF) architecture is known as one implementing method of performing pipeline processing on the FFT algorithm. For example, Non-Patent Literature 1 discloses details of the SDF architecture. FIG. 11 illustrates a configuration of an FFT circuit having Radix-2 DIF SDF architecture disclosed in Non-Patent Literature 1. An FFT circuit 8 illustrated in FIG. 11 includes a pipeline including L butterfly processing elements (referred to as butterfly PEs below) 80_1 to 80_L connected with each other, and the FFT circuit 8 also includes a sequence transforming unit 90. Note that, L is equal to log₂N when the number of FFT points is N.

The butterfly PE 80_1 receives a time domain sequence X(n) in natural order, performs N/2 butterfly operations corresponding to a first stage in FIG. 10, and outputs a butterfly operation result to the butterfly PE 80_2 of the next stage. The butterfly PEs 80_2 to 80_L perform butterfly operations corresponding to a second stage to an Lth stage. Accordingly, the butterfly PE 80_L of the Lth stage outputs a frequency domain sequence Y(k) in bit-reversed order. Further, the sequence transforming unit 90 transforms the frequency domain sequence Y(k) in bit-reversed order into natural order. For the sake of description, output data (i.e., intermediate result data or frequency domain data) of a butterfly PE 80_S of an Sth stage is expressed as $G_S(i)$. The integer i represents a DFG index, and is equal to or more than 0 and equal to or less than N. The integer S represents the number of stages, and is equal to or more than 1 and equal to or less than L.

FIG. 12 is a block diagram illustrating a configuration of the butterfly PE 80_S of the Sth stage. The butterfly PE 80_S includes a butterfly processor 810, a delay circuit 820 and a counter 830. The butterfly processor 810 has two input ports IN1 and IN2 and two output ports OUT1 and OUT2. The first input port IN1 receives output data of the delay circuit 820. The second input port IN2 receives an output data sequence $G_{S-1}(i)$ from a butterfly PE 80_S−1 of the previous stage. The first output port OUT1 is connected to an input port of the delay circuit 820, and supplies data to the delay circuit 820. The second output port OUT2 supplies an output data sequence $G_S(i)$ to a butterfly PE 80_S+1 of a next stage or the sequence transforming unit 90.

The delay circuit 820 is arranged in a feedback path for feeding back an output of the butterfly processor 810 to an input thereof. The delay circuit 820 is a memory which can store data corresponding to $2^{L-S}$ words, and outputs the stored data in FIFO (First In First Out) order. The delay circuit 820 is, for example, a FIFO buffer or a shift register. The counter 830 is an L-bit counter, and is reset to 0 at a timing when output data $G_{S-1}(0)$ of a DFG index "0" is input from the butterfly PE 80_S−1 of the previous stage. The counter 830 supplies a counter value C to a butterfly processor 110.

FIGS. 13A and 13B are block diagrams illustrating a configuration of the butterfly processor 810 illustrated in FIG. 12. The butterfly processor 810 shown in FIGS. 13A and 13B includes an adder 811, a subtractor 812, a multiplier 813, a twiddle factor selecting unit 814 and a selector (multiplexer) 815. As described above, the first input port IN1 receives the output data of the delay circuit 820, and the second input port IN2 receives the output data sequence $G_{S-1}(i)$ of the butterfly PE 80_S−1 of the previous stage. The adder 811, the subtractor 812 and the multiplier 813 perform the butterfly operation, which is illustrated in FIG. 9, on these two input data sequences.

The twiddle factor selecting unit 814 provides the multiplier 813 the twiddle factor $W_N^k$ selected based on the counter value C of the counter 830. The selector 815 includes two selector elements 816 and 817. The selector element 816 selects, according to the counter value C, either data supplied form the delay circuit 820 or output data of the adder 811, and supplies the selected data to the second output port OUT2. Meanwhile, the selector element 817 selects, according to the counter value C, either the data $G_{S-1}(i)$ supplied from the butterfly PE 80_S-1 of the previous stage or output data of the multiplier 813, and supplies the selected data to the first output port OUT1.

Next, the butterfly PE 80_S of the Sth stage will be focused upon to describe an operation thereof. In the following explanation, $b_P(q)$ represents a Pth bit from the least significant bit (LSB) of binary representation of a natural number q. The butterfly PE 80_S performs butterfly operations corresponding to one stage (i.e., N/2 butterfly operations) in order from the top of the data flow graph (e.g., in FIG. 10). More specifically, when a (L−S+1)th bit from the least significant bit (LSB) in binary representation of the counter value C is 0 (i.e., when $b_{L-S+1}(C)=0$), the selector elements 816 and 817, arranged in the selector 815, each select a port #0 side as illustrated in FIG. 13A. Consequently, output data $G_{S-1}(C)$ of the butterfly PE 80_S-1 of the previous stage is fed to the delay circuit 820 without being subjected to the butterfly operation.

Meanwhile, when $b_{L-S+1}(C)=1$, the selector elements 816 and 817, arranged in the selector 815, each select the port #1 side as illustrated in FIG. 13B. The butterfly processor 810 generates data $G_S(C-2^{L-S})$ and $G_S(C)$ by performing a butterfly operation using the output data $G_{S-1}(C)$ of the butterfly PE 80_S-1 of the previous stage and data $G_{S-1}(C-2^{L-S})$ delayed by $2^{L-S}$ cycles by the delay circuit 820. One butterfly operation result $G_S(C-2^{L-S})$ is fed to the butterfly PE 80_S+1 of the next stage through the selector element 816. On the other hand, the other butterfly operation result $G_S(C)$ is fed to the delay circuit 820 through the selector element 817. The butterfly operation result $G_S(C)$ is delayed by $2^{L-S}$ cycles by the delay circuit 820, and is fed to the butterfly PE 80_S+1 of the next stage when $b_{L-S+1}(C)=0$.

FIG. 14 is a table illustrating input and output data of the butterfly processor 810 arranged in the butterfly PE 80_2 of the second stage when N=16 (i.e., L=4). For reference, FIG. 14 illustrates decimal representation (DEC.) and binary representation (BIN.) of the counter values C, and the ports (#0 or #1) of the selector 815. In the example in FIG. 14, when $b_3(C)=1$, i.e., when decimal representation of the counter value C is any one of 4 to 6 and 12 to 15, a butterfly operation result $G_2(C-4)$ of the second stage is fed to the butterfly PE 80_3 of the third stage and $G_2(C)$ is fed to the delay circuit 820. Meanwhile, when $b_3(C)=0$, i.e., when decimal representation of the counter value C is anyone of 0 to 3 and 8 to 11, output data $G_1(C)$ of the butterfly PE 80_1 of the first stage is fed to the delay circuit 820 and $G_2(C-4)$, which is delayed by four cycles by the delay circuit 820, is fed to the butterfly PE 80_3 of the third stage.

A delay amount of the L-stage butterfly PEs 80_1 to 80_L in the above-described pipeline FFT circuit 8 having Radix-2 DIF SDF architecture is expressed by following formula (3).

$$\sum_{S=1}^{L} 2^{L-S} = N - 1 \quad (3)$$

Next, the sequence transforming unit 90 illustrated in FIG. 11 will be described. As described above, the sequence transforming unit 90 transforms the frequency domain sequence Y(k), output from the butterfly PE 80_L of the Lth stage, from bit-reversed order to natural order, and outputs the frequency domain sequence Y(k) in natural order. FIG. 15 is a block diagram illustrating a configuration example of the sequence transforming unit 90. The sequence transforming unit 90 shown in FIG. 15 includes a memory 910, an address generating unit 920 and a counter 930.

The counter 930 is an L-bit counter, and is reset to 0 when the sequence transforming unit 90 receives data Y(0). The counter 930 supplies its counter value to the address generating unit 920. Further, the counter 930 sends a mode signal to the address generating unit 920 according to the number of times of processed FFTs. More specifically, the counter 930 generates the mode signal having the value "0" when the number of times of processed FFTs is odd, and generates the mode signal having the value "1" when the number of times of processed FFTs is even.

The address generating unit 920 sends Write and Read addresses to the memory 910. More specifically, in the case of a mode 0, the address generating unit 920 outputs values obtained by bit-reversing the counter value (0, . . . , or N−1 in decimal representation) of the L-bit counter 930, i.e., $br_L(0)$, and $br_L(N-1)$ as the Write and Read addresses. Meanwhile, in the case of a mode 1, the address generating unit 920 sends the counter value (0, or N−1 in decimal representation) of the L-bit counter 930 as the Write and Read addresses.

The memory 910 is an N-word memory. The memory 910 transforms the frequency domain sequence Y(k) from bit-reversed order to natural order, to output the frequency domain sequence Y(k) in natural order, by reading and writing the frequency domain sequence Y(k) according to the Write and Read addresses generated by the address generating unit 920.

The sequence transforming unit 90 shown in FIG. 15 operates as follows. First, when receiving the first input of the frequency sequence Y(k), the sequence transforming unit 90 operates in the mode 0. Hence, the input sequence $Y(br_L(0))$, . . . , and $Y(br_L(N-1))$ in bit-reversed order is written into the memory 910 according to the Write address ($br_L(0)$, . . . , and $br_L(N-1)$) obtained by bit-reversing the counter value of the counter 930. Consequently, when the N-word frequency domain sequence Y(k) is written into the memory 910 during the mode 0, the memory 910 stores this data in natural order. The N-word frequency domain sequence Y(k) has been written into the memory 910 during the mode 0 is read out during the mode 1. The Read address during the mode 1 is the counter value itself of the counter 930, and therefore the memory 910 outputs the frequency domain sequence Y(k) in natural order. In addition, the frequency domain sequence Y(k) obtained by next FFT is immediately written into the address from which the frequency domain sequence Y(k) has been read out during the mode 1. Consequently, it is possible to prevent unread frequency domain data from being overwritten.

When the N-word frequency domain sequence Y(k) is written into the memory 910 during the mode 1, the memory 910 stores this data in bit-reversed order. The N-word frequency domain sequence Y(k) has been written into the memory 910 during the mode 1 is read out during the mode 0. The Read address during the mode 0 is obtained by bit-reversing the counter value of counter 930, and therefore the memory 910 outputs the frequency domain sequence Y(k) in natural order.

The memory 910 temporary stores N-word data, and hence the delay amount of the sequence transforming unit 90 is N cycles. Consequently, a total delay amount of the pipeline FFT circuit 8 including the delay amount of the butterfly PEs 80_1 to 80_L expressed in formula (3) is 2N−1 as expressed in following formula (4).

$$N + \sum_{S=1}^{L} 2^{L-S} = 2N - 1 \quad (4)$$

CITATION LIST

Non Patent Literature

[Non Patent Literature 1] Y.-N. Chang, "An efficient VLSI architecture for normal I/O order pipeline FFT design", IEEE; Transactions on Circuits and Systems II, Express Briefs, vol. 55, no. 12, pp. 1234-1238, December 2008

SUMMARY OF INVENTION

Technical Problem

Since a frequency domain sequence output from the butterfly PE 80_L of the final stage is in bit-reversed order, the above-described pipeline FFT circuit 8 needs the sequence transforming unit 90 to transform the frequency domain sequence from bit-reversed order to natural order. Therefore, the total delay amount becomes 2N−1 and becomes significant. Further, an increase in a word length (a register size or a memory size) of a memory or a register (i.e., the delay circuit 820 and the memory 910) which performs delay causes an increase in a circuit scale of the pipeline FFT circuit 8.

The present invention has been made in light of the above problem. An object of the present invention is to provide an FFT circuit and a method of performing FFT which can generate an output sequence in natural order based on an input sequence in natural order with a little total delay amount.

Solution to Problem

In a first aspect, a Fast Fourier Transform (FFT) circuit includes a pipeline in which L number of butterfly operational elements each having Single-path Delay Feedback (SDF) architecture are connected with each other. The L number of butterfly operational elements include LHF number of first butterfly operational elements corresponding to a first stage to an LHFth stage, and LHS number of second butterfly operational elements corresponding to a (LHF+1)th stage to an Lth stage, where LHF+LHS=L. Each of the LHF number of first butterfly operational elements is configured to rearrange output data order such that, in units of $N/(2^{S-1})$ pieces of output data starting from head output data whose Data Flow Graph (DFG) index i is "0", intermediate result data $G_S(i)$ whose $b_S(i)$ is 1 is output after intermediate result data $G_S(i)$ whose $b_S(i)$ is 0 in the $N/(2^{S-1})$ pieces of the output data. Note that, N represents the number of FFT points, S represents an integer indicating a stage number equal to or more than 1 and equal to or less than LHF, and $b_S(i)$ represents the Sth bit from the least significant bit in binary representation of the DFG index i.

In a second aspect, a Fast Fourier Transform (FFT) circuit includes a pipeline in which L number of butterfly operational elements each having Single-path Delay Feedback (SDF) architecture are connected with each other. The L number of butterfly operational elements include LHF number of first butterfly operational elements corresponding to a first stage to an LHFth stage, and LHS number of second butterfly operational elements corresponding to a (LHF+1)th stage to an Lth stage, where LHF+LHS=L, The LHF number of first butterfly operational elements are configured to transform data order of an intermediate result sequence generated by the first butterfly operational element of the LHFth stage into bit-reversed order of Data Flow Graph (DFG) index by sequentially rearranging data order of an intermediate result sequence generated at each stage. Further, the LHS number of second butterfly operational elements are configured to output a frequency domain sequence in natural order from the second butterfly operational element of the Lth stage by keeping the data order of the intermediate result sequence generated at the LHFth stage.

In a third aspect, a Fast Fourier Transform (FFT) circuit includes a pipeline in which L number of butterfly operational elements each having Single-path Delay Feedback (SDF) architecture are connected with each other. The L number of butterfly operational elements include LHF number of first butterfly operational elements corresponding to a first stage to an LHFth stage, and LHS number of second butterfly operational elements corresponding to a (LHF+1)th stage to an Lth stage, where LHF+LHS=L. Each of the LHF number of first butterfly operational elements includes a first butterfly processor which outputs data to a data path and a feedback path, a first delay circuit which is arranged in the feedback path, and a sequence transform circuit. Further, the sequence transform circuit includes a second delay circuit which is arranged in the feedback path between an output of the butterfly processor and an input of the first delay circuit, and a selector which switches a signal path between the data path and the feedback path at between the output of the second delay circuit and the input of the first delay circuit. Note that, S represents an integer equal to or more than 1 and equal to less than LHF indicating a stage number.

In a fourth aspect, a method is provided for performing Fast Fourier Transform (FFT) using a pipeline in which L number of butterfly operational elements each having Single-path Delay Feedback (SDF) architecture are connected with each other. The method includes, by LHF number of butterfly operational elements corresponding to a first stage to an LHFth stage, rearranging output data order such that, in units of $N/(2^{S-1})$ pieces of output data starting from head output data whose Data Flow Graph (DFG) index i is "0", intermediate result data $G_S(i)$ whose $b_S(i)$ is 1 is output after intermediate result data $G_S(i)$ whose $b_S(i)$ is 0 in the $N/(2^{S-1})$ pieces of the output data. Note that, N represents the number of FFT points, S represents an integer indicating a stage number equal to or more than 1 and equal to or less than LHF, and $b_S(i)$ represents the Sth bit from the least significant bit in binary representation of the DFG index i.

In a fifth aspect, a method is provided for performing Fast Fourier Transform (FFT) using a pipeline in which L number of butterfly operational elements each having Single-path Delay Feedback (SDF) architecture are connected with each other. Note that, the L number of butterfly operational elements including LHF number of first butterfly operational elements corresponding to a first stage to an LHFth stage, and LHS number of second butterfly operational elements corresponding to a (LHF+1)th stage to an Lth stage, where LHF+LHS=L. The method according to the fifth aspect includes:

(a) by the LHF number of first butterfly operational elements, transforming data order of an intermediate result sequence generated by the first butterfly operational element of the LHFth stage into bit-reversed order of Data Flow Graph DFG) index by sequentially rearranging data order of an intermediate result sequence generated at each stage; and
(b) by the LHS number of second butterfly operational elements, outputting a frequency domain sequence in natural order from the second butterfly operational element of the Lth stage by keeping the data order of the intermediate result sequence generated at the LHFth stage.

Advantageous Effects of Invention

According to the above first to fifth aspects, it is possible to provide an FFT circuit and a method of performing FFT which can generate an output sequence in natural order based on an input sequence in natural order with a little total delay amount.

BRIEF DESCRIPTION OF DRAWINGS

FIG. 4A is a table showing input and output data of a butterfly processor and a sequence transforming unit arranged in a first-stage butterfly PE (a first-type butterfly PE) according to an embodiment in the case where N=16 (i.e., L=4);

FIG. 4B is a table showing input and output data of a butterfly processor and a sequence transforming unit arranged in a first-stage butterfly PE (a first-type butterfly PE) according to an embodiment in the case where N=16 (i.e., L=4);

FIG. 5 is a table showing input and output data of a butterfly processor and a sequence transforming unit arranged in a second-stage butterfly PE (a first-type butterfly PE) according to an embodiment in the case where N=16 (i.e., L=4);

FIG. 8 is a table showing input and output data of a butterfly processor arranged in a third-stage butterfly PE (a second-type butterfly PE) according to an embodiment in the case where N=16 (i.e., L=4);

FIG. 10 is a data flow graph of 16 point (N=2⁴=16) Radix-2 DIF FFT (Related Art);

FIG. 14 is a table showing input and output data of a butterfly processor arranged in a second-stage butterfly PE (Related Art)

DESCRIPTION OF EMBODIMENTS

Figure 1:
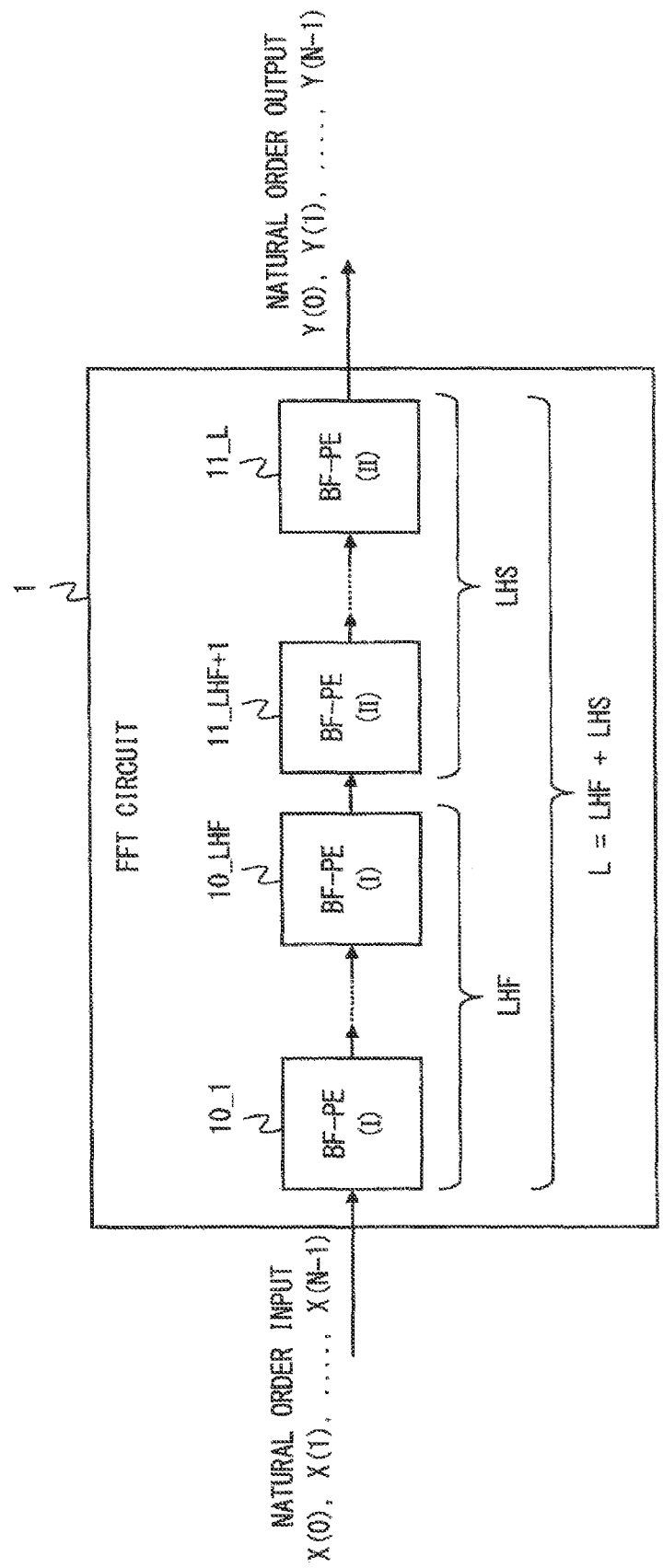
FIG. 1 is a block diagram showing an illustrative configuration of a FFT circuit according to an embodiment.

Specific embodiments will be described in detail below with reference to the drawings. In drawings, the same or identical components will be assigned the same reference numerals, and overlapping description thereof will be omitted when necessary for clarification of the description.

First Embodiment

FIG. 1 is a block diagram illustrating a configuration example of a pipeline FFT circuit 1 according to the present embodiment. The FFT circuit 1 illustrated in FIG. 1 is a modification of a Radix-2 DIF SDF architecture, and outputs an output sequence (frequency domain sequence) in natural order based on an input sequence (time domain sequence) in natural order. For ease of description, an integer LHF equal to or more than 1 and an integer LHS equal to or more than 0 are defined by following formulae (5) and (6). N represents the number of FFT points, and L represents log 2N. Further, a right side of formula (5) indicates a ceiling function, and a right side of formula (6) indicates a floor function.

$$LHF=\lceil L/2 \rceil \quad (5)$$

$$LHS=L-LHF=\lfloor L/2 \rfloor \quad (6)$$

Figure 10:
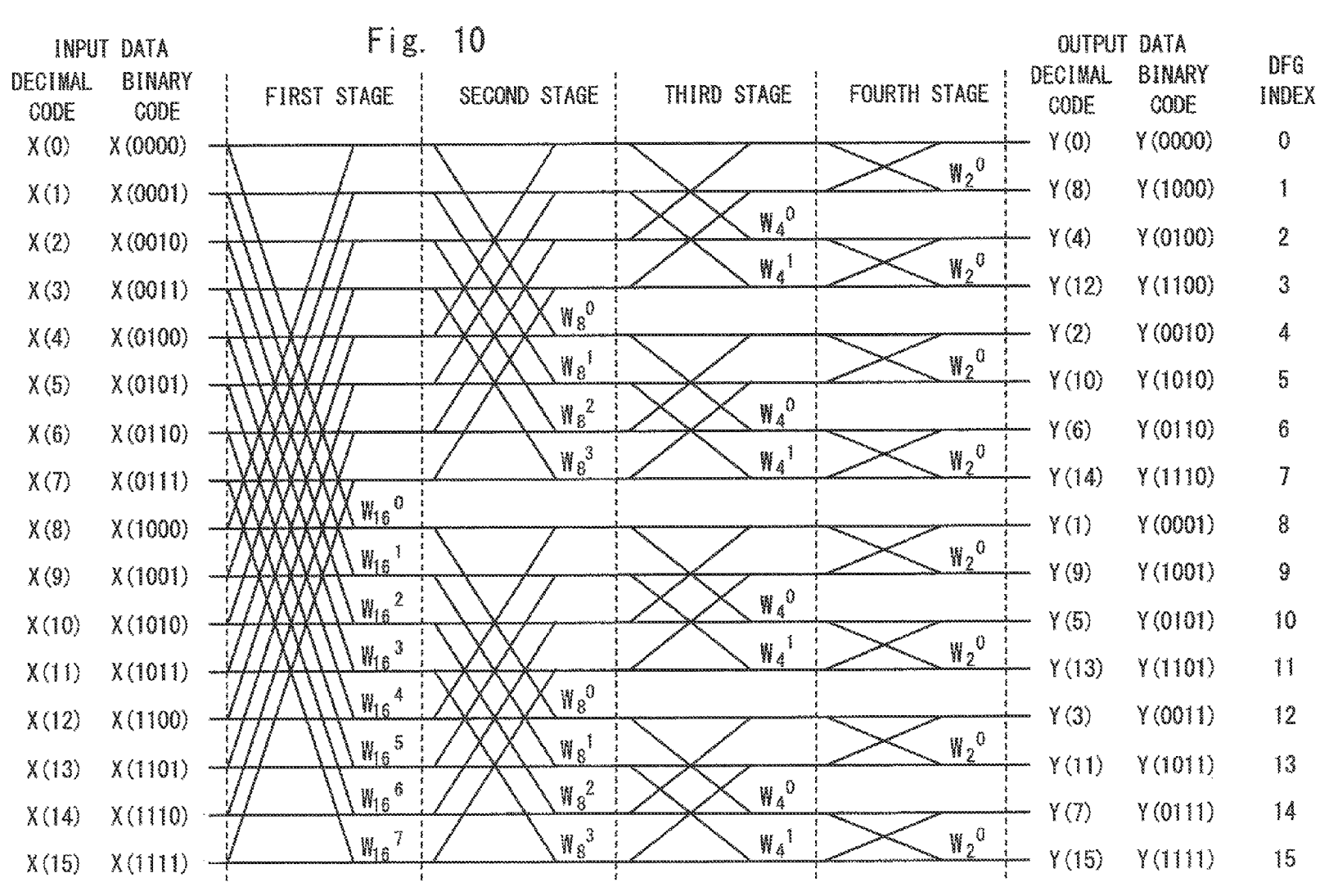

The FFT circuit i includes a pipeline in which L number of butterfly PEs connected with each other. More specifically, as illustrated in FIG. 1, the pipeline includes LHF number of first-type butterfly PEs 10_1 to 10_LHF and LHS number of second-type butterfly PEs 11_LHF+1 to 11_L. The LHF number of first-type butterfly PEs 10 are arranged at a first stage to an LHFth stage of an anterior section. Meanwhile, the LHS number of second-type butterfly PEs 11 are arranged at a (LHF+1)th stage to an Lth stage of a posterior section. The first-type butterfly PE 10_1 arranged at the first stage receives a time domain sequence X(n) in natural order, performs N/2 butterfly operations corresponding to the first stage in FIG. 10, and outputs a butterfly operation result to the butterfly PE 10_2 of the next stage. The rest of the first-type butterfly PEs 10_2 to 10_LHF and the second-type butterfly PEs 11_LHF+1 to 11_L perform butterfly operations corresponding to the second stage to the Lth stage.

One of differences of the FFT circuit 1 according to the present embodiment from the FFT circuit 8 according to related art is that the second-type butterfly PE 11_L arranged at the final Lth stage outputs a frequency domain sequence in natural order not in bit-reversed order. To contribute to the function, in the present embodiment, each of the first-type butterfly PEs 10_1 to 10_LHF includes a sequence transforming mechanism using small scale hardware, and thus the first-type butterfly PEs 10_1 to 10_LHF are configured to sequentially rearrange data order of an intermediate result sequence $G_S(k)$. More specifically, the butterfly PEs 10_1 to 10_LHF change data order such that the butterfly PE 10_LHF of the LHFth stage outputs an intermediate result sequence $G_{LHF}(k)$ in bit-reversed order of DFG indices. Meanwhile, each of the second-type butterfly PEs 11_LHF+1 to 11_L arranged at the (LHF+1)th stage to the Lth stage in the posterior section is configured to output an output sequence $G_S(k)$ while keeping the DFG index order of input data, i.e., in bit-reversed order of the DFG indices.

The FFT circuit 1 according to the present embodiment sequentially changes output data order (output order of DFG indices) at the first to LHFth stages of FFT, thereby outputting a frequency domain sequence Y(k) in natural order based on the time domain sequence X(n) in natural order. Consequently, it is possible to reduce the total delay amount of the FFT circuit 1 compared to a total delay amount 2N−1 of the FFT circuit 8 according to the related art. Specific examples of configurations and operations of the first-type and second-type butterfly PEs 10 and 11 will be described below.

Figure 2:
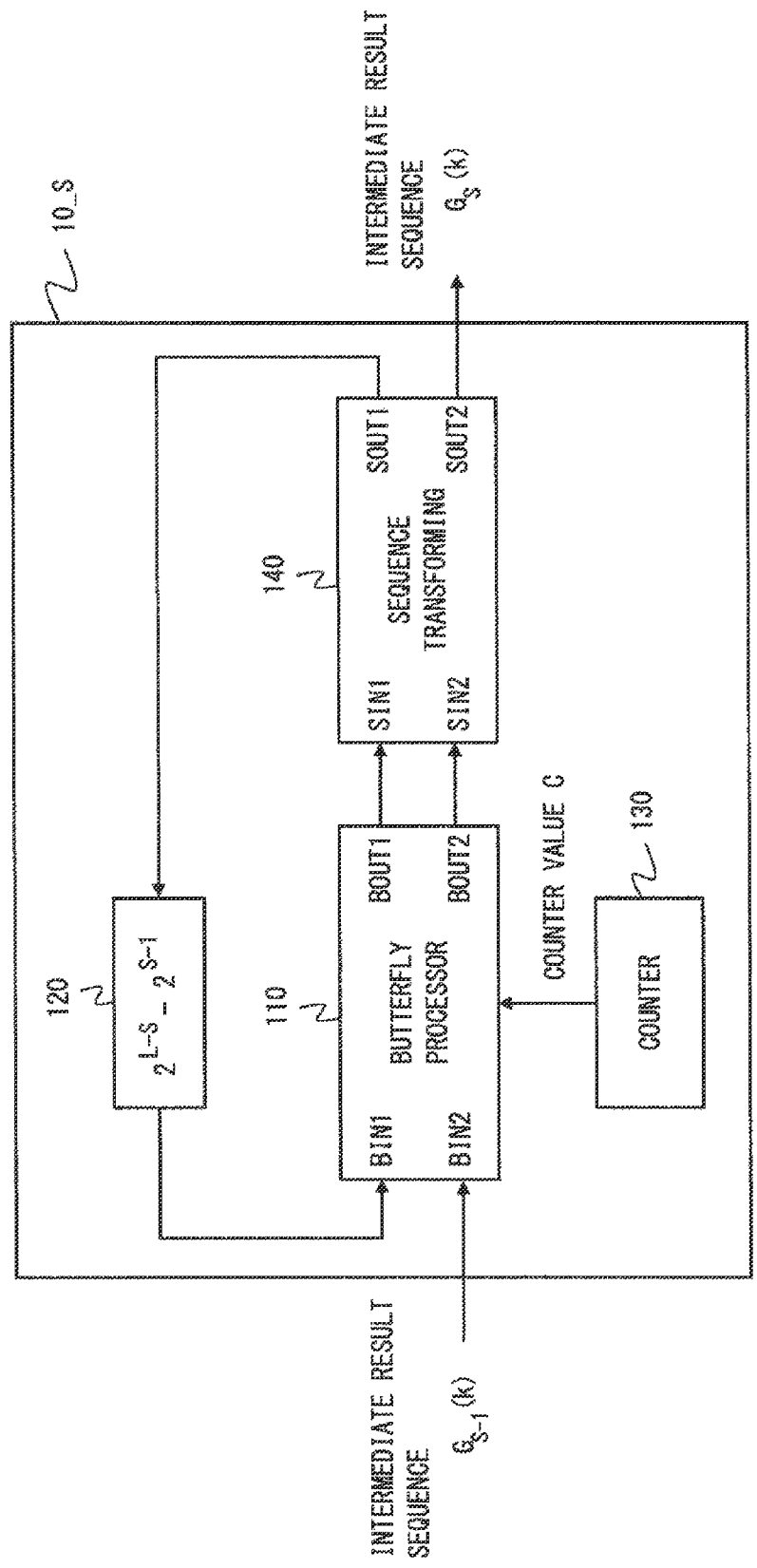
FIG. 2 is a block diagram showing an illustrative configuration of a first-type butterfly PE included in a FFT circuit according an embodiment.

FIG. 2 is a block diagram illustrating a configuration example of a first-type butterfly PE 10_S of an Sth stage, where S represents an integer equal to or more than 1 and equal to or less than LHF (i.e., S=1, . . . , and LHF). The butterfly PE 10_S shown in FIG. 2 includes a butterfly processor 110, a delay circuit 120, a counter 130 and a sequence transforming unit 140. The sequence transforming unit 140 is arranged between the butterfly processor 110 and the delay circuit 120.

Figure 12:
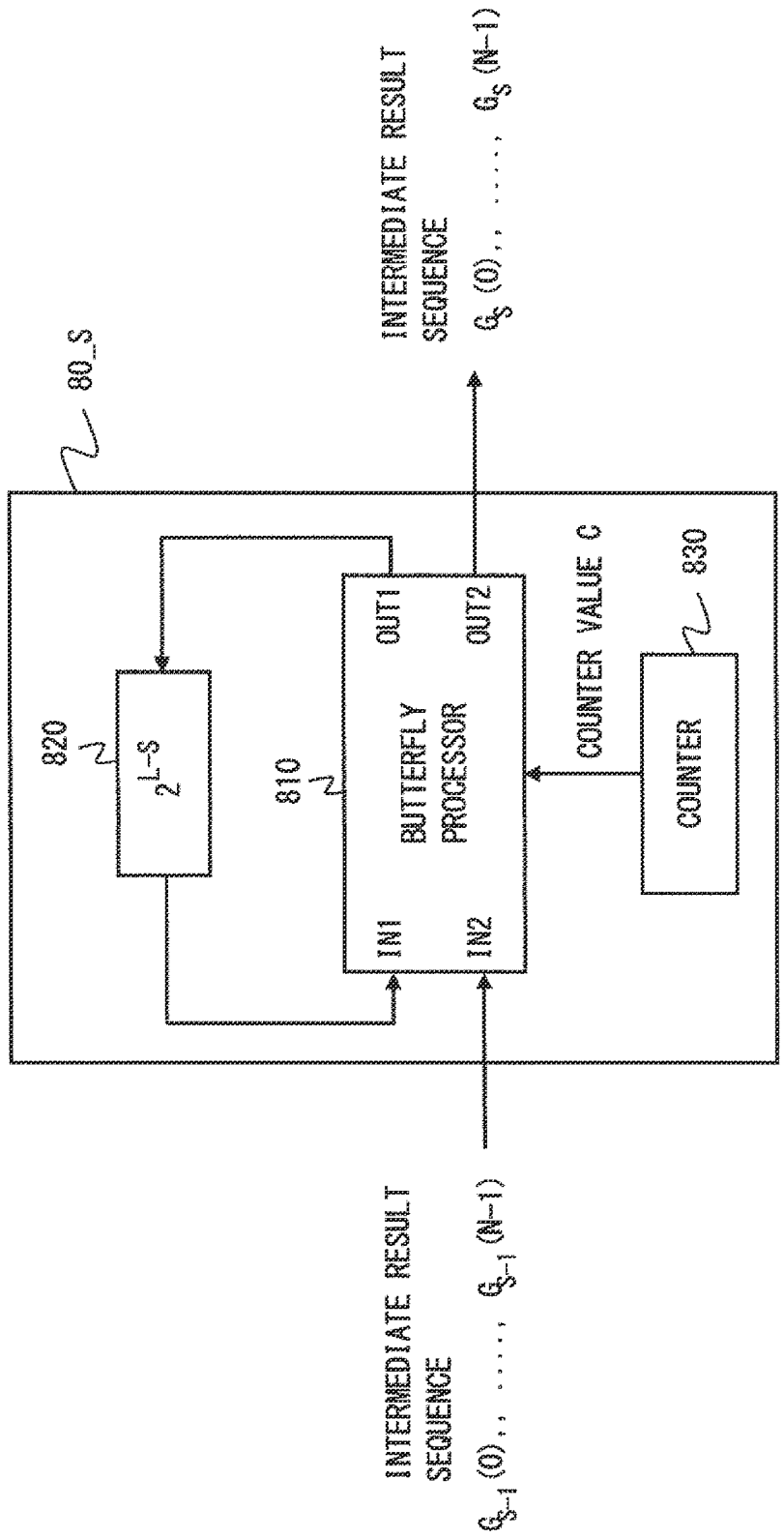
FIG. 12 is a block diagram showing an illustrative configuration of a butterfly PE included in a FFT circuit according to Related Art.

A basic configuration of the butterfly processor 110 is the same as a configuration of the butterfly processor 810 illustrated in FIG. 12. However, since the sequence transforming unit 140 is added, output data of the butterfly processor 110 is fed to the sequence transforming unit 140. Further, processing order of butterfly operations in the butterfly processor 110 being changed, selection order of twiddle factors in the butterfly processor 110 is different from a selection order of twiddle factors in the butterfly processor 810. The butterfly processor 110 has two input ports BIN1 and BIN2 and two output ports BOUT1 and BOUT2. The first input port BIN1 receives output data of the delay circuit 120. The second input port BIN2 receives an output data sequence $G_{S-1}(k)$ of the butterfly PE 10_S−1 at the previous stage. A first output port SOUT1 is connected to a first input port SIN1 of the sequence transforming unit 140. A second output port SOUT2 is connected to a second input port SIN2 of the sequence transforming unit 140.

The delay circuit 120 is arranged in a feedback path for feeding back an output of the butterfly processor 110 to an input thereof. The delay amount of the delay circuit 120 is different from the delay amount of the delay circuit 820 illustrated in FIG. 12. More specifically, while the delay amount of the delay circuit 820 is $2^{L-S}$, the delay amount of the delay circuit 120 according to the present embodiment is $2^{L-S}-2^{S-1}$ in order to compensate the delay amount $2^{S-1}$ of a delay circuit 141 arranged in the sequence transforming unit 140 described below. The delay circuit 120 may be, for example, a FIFO buffer or a shift register.

A configuration and an operation of the counter 130 may be the same as those of the counter 830 illustrated in FIG. 12. That is, the counter 130 is an L-bit counter, and is reset to 0 at a timing when output data $G_{S-1}(0)$ of a DFG index "0" is input from the butterfly PE of the previous stage. The counter 130 supplies a counter value C to the butterfly processor 110.

Figure 3:
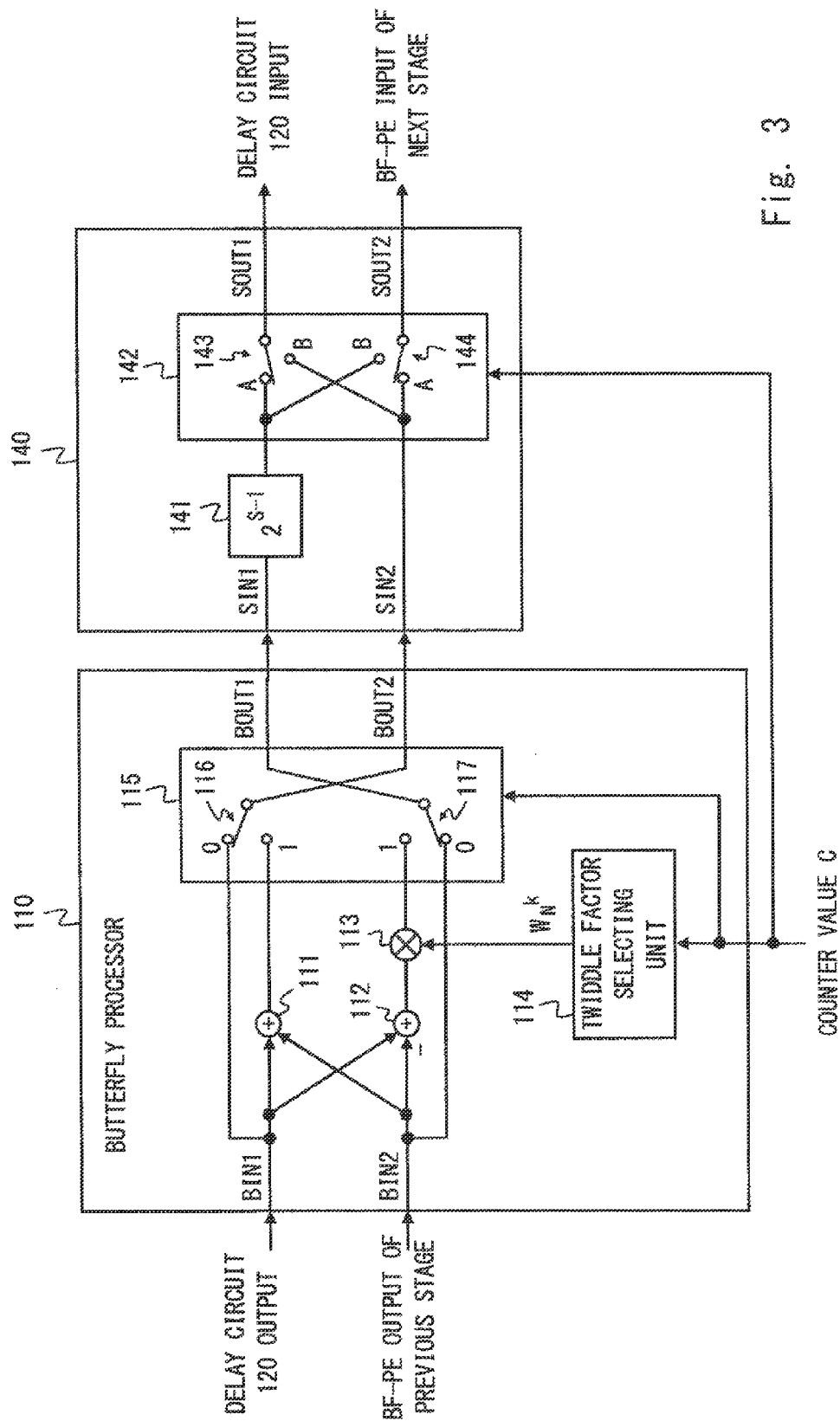
FIG. 3 is a block diagram showing an illustrative configuration of a butterfly processor and a sequence transforming unit included in the first-type butterfly PE described in FIG. 2.

FIG. 3 is a block diagram illustrating configuration examples of the butterfly processor 110 and the sequence transforming unit 140 illustrated in FIG. 2. The butterfly processor 110 includes an adder 111, a subtractor 112, a multiplier 113, a twiddle factor selecting unit 114 and a selector (multiplexer) 115. The operation of the twiddle factor selecting unit 114 is the same as the twiddle factor selecting unit 814 illustrated in FIGS. 13A and 13B, except a difference in the selection order of twiddle factors $W_N^k$. The twiddle factor selecting unit 114 can be implemented using, for example, an address generator which generates an address according to the counter value C and a twiddle factor memory (Look Up Table (LUT)) which outputs a twiddle factor corresponding to the address.

Figure 13A:
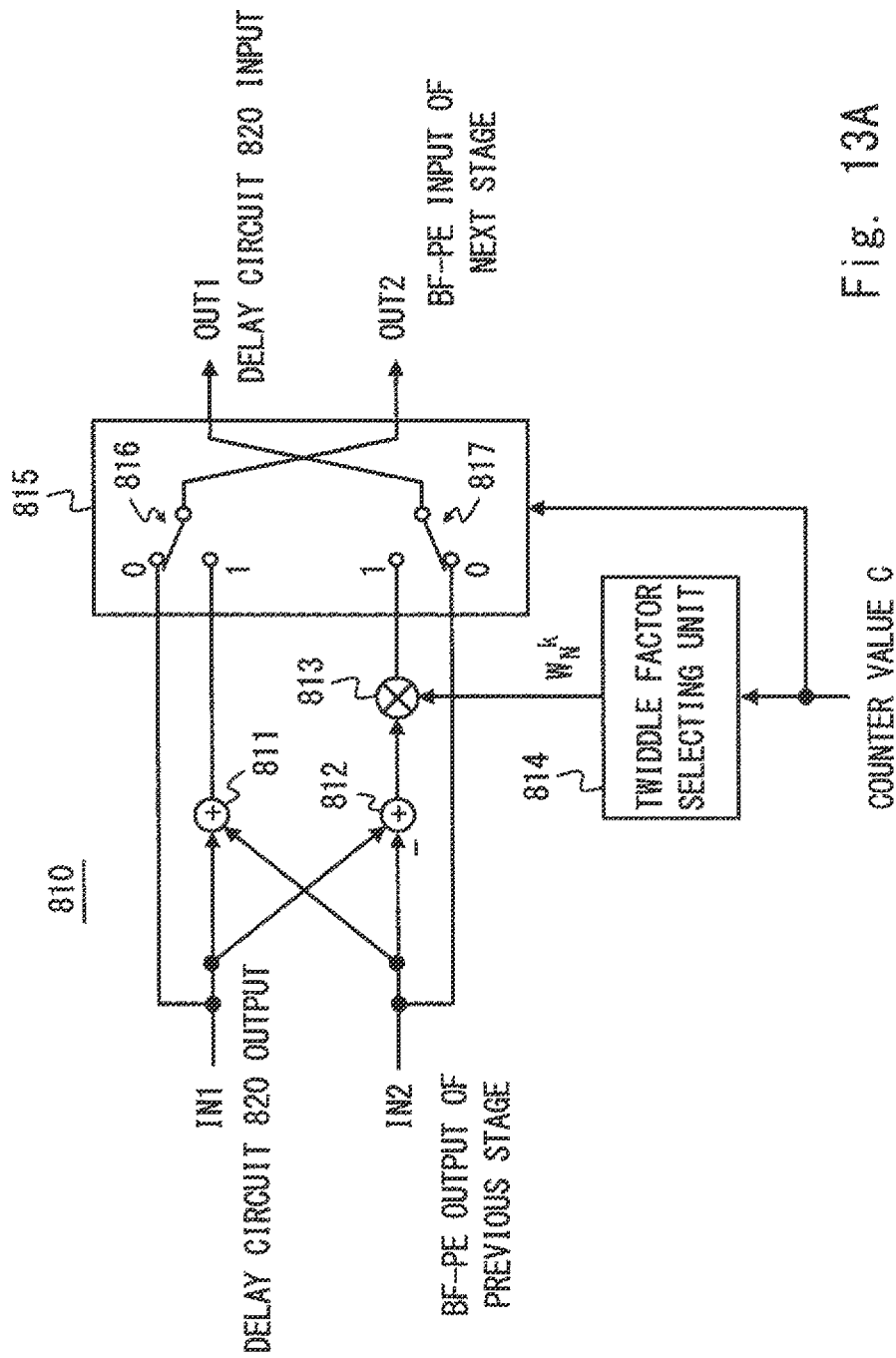
FIG. 13A is a block diagram showing an illustrative configuration of a butterfly PE included in a FFT circuit according to Related Art.
Figure 13B:
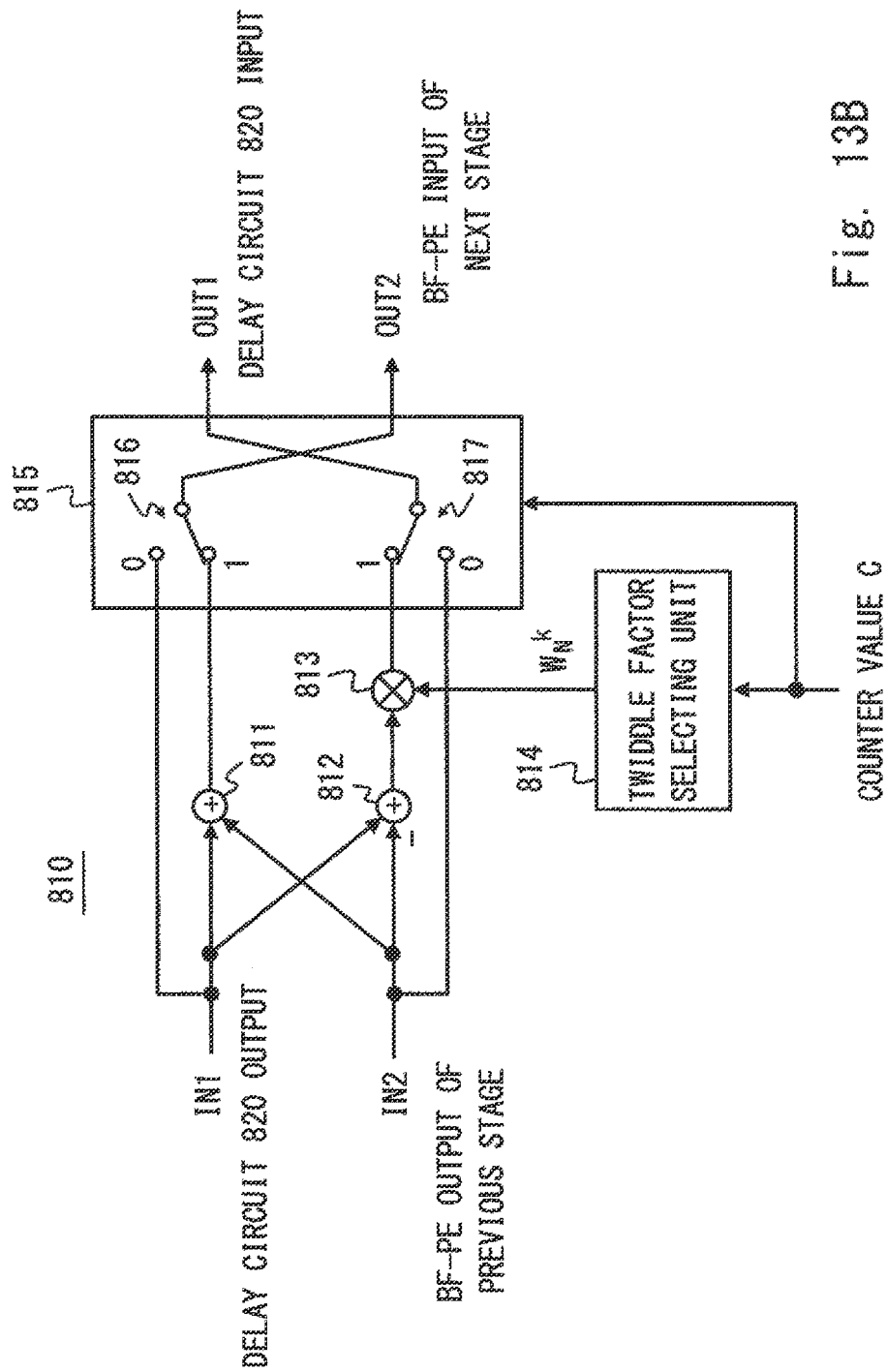
FIG. 13B is a block diagram showing an illustrative configuration of a butterfly PE included in a FFT circuit according to Related Art.
Figure 15:
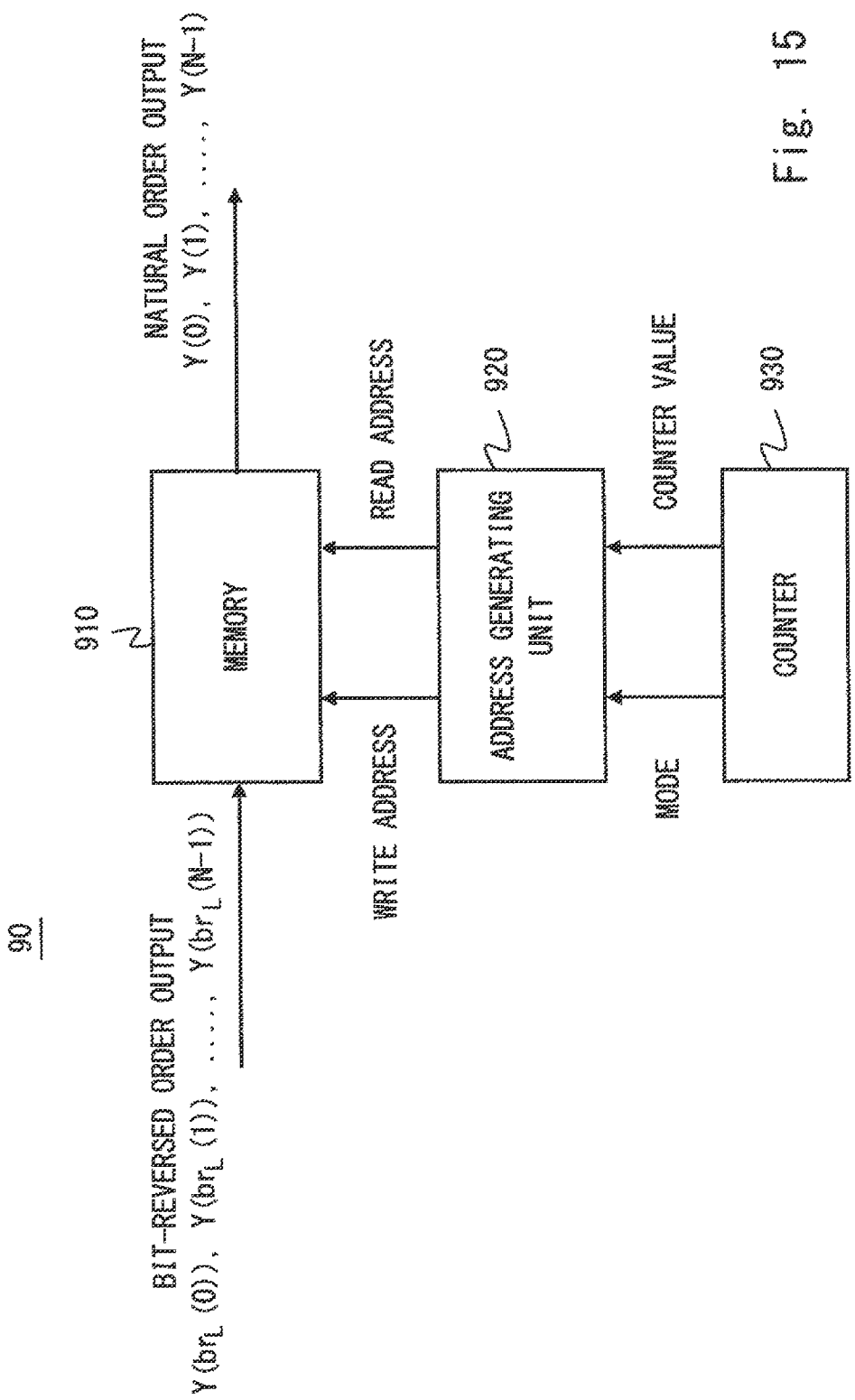
FIG. 15 is a block diagram showing an illustrative configuration of a sequence transforming unit included in a FFT circuit according to Related Art.

The configuration and the operation of the selector 115 are the same as those of the selector 815 illustrated in FIGS. 13A and 13B. That is, the selector 115 includes two selector elements 116 and 117. The selector element 116 selects, according to the counter value C, either data supplied from the delay circuit 120 or output data of the adder 111, and supplies the selected data to the second output port BOUT2. Meanwhile, the selector element 117 selects, according to the counter value C, either the data $G_{S-1}(i)$ supplied from the butterfly PE 10_S−1 of the previous stage or output data of the multiplier 113, and supplies the data to the first output port BOUT1.

The sequence transforming unit 140 includes the delay circuit 141 and a selector (multiplexer) 142. The delay circuit 141 delays data supplied to the first input port SIN1, i.e., the first output data of the butterfly processor 110, by $2^{S-1}$ cycles, and outputs the delayed data. The delay circuit 141 may be, for example, a FIFO buffer or a shift register. The selector 142 is a two-input and two-output switch which operates according to the counter value C of the counter 130. The selector 142 supplies the first output port SOUT1 with one of output data of the delay circuit 141 and data received at the second input port SIN2 in order to feed it to the delay circuit 120, and supplies the second output port SOUT2 with the other data in order to feed it to the butterfly PE 10 or 11 at the next stage. The selector 142 outputs the two pieces of input data straight or crosses and outputs the two pieces of input data. For example, as illustrated in FIG. 3, the selector 142 includes selector elements 143 and 144 which operate in a complementary fashion. That is, the selector element 143 selects one data to be fed to the first output port OUT1 (i.e., delay circuit 120). The selector element 144 selects the other data to be fed to the second output port OUT2 (i.e., the butterfly PE of the next stage).

As is understandable from the configuration examples in FIGS. 2 and 3, in the present embodiment, it can also be paraphrased as that the total delay amount of $2^{L-S}$ cycles is divided into a first delay element (i.e., the delay circuit 141) corresponding to $2^{S-1}$ cycles and a second delay element (i.e., the delay circuit 120) corresponding to $2^{L-S}-2^{S-1}$ cycles. Further, the selector 142 is arranged between these two delay elements. Consequently, in the present embodiment, a delay amount produced by a delay feedback used in the SDF architecture can be switched between $2^{L-S}$ and $2^{S-1}$. Further, in the present embodiment, a butterfly operation result (intermediate result data) of the Sth stage which is obtained at the second output port (BOUT2) of the butterfly-processor 110 can be delay-fed back (with a delay amount $2^{L-1}-2^{S-1}$) to the first input port SIN1 of the butterfly processor 110. Furthermore, in the present embodiment, a butterfly operation result data (intermediate result data) of the Sth stage which is obtained at the first output port (BOUT1) of the butterfly processor 110 can be delayed by $2^{S-1}$ cycles and fed to the butterfly processor PE 10 or 11 of the next stage.

Consequently, the first-type butterfly PE 10_S illustrated in FIGS. 2 and 3 can change data order (output order of DFG indices) of the intermediate result sequence $G_S(k)$ of the Sth stage using the sequence transforming unit 140 which employs a simple configuration with a little delay. More specifically, the butterfly PE 10_S of the Sth stage (S=1, ..., and LHF) only needs to rearrange the output data order such that intermediate result data $G_S(i)$ whose Sth bit from the least significant bit (LSB) in binary representation of the DFG index i is "1" is output after the intermediate result data $G_S(i)$ whose Sth bit from the least significant (LSB) bit is "0". Note that, this data rearrangement may be performed in units of $N/(2^{S-1})$ pieces of data starting from head output data whose DFG index is "0". This is because rearranging the least significant bit (LSB) to an S−1th bit of binary representation of the DFG index has been finished by the butterfly PEs 10 up to the S−1th stage.

In other words, the butterfly PE 10_S of the Sth stage (S=1, ..., and LHF) only needs to rearrange output data order such that, in units of $N/(2^{S-1})$ pieces of output data starting from head output data whose DFG index i is "0", the intermediate result data $G_S(i)$ whose $b_S(i)$ is 1 is output after the intermediate result data $G_S(i)$ whose $b_S(i)$ is 0 in these $N/(2^{S-1})$ pieces of output data. Note that, $b_S(i)$ represents the Sth bit from the least significant bit in binary representation of the DFG index i. Consequently, the LHF butterfly PEs 10_1 to 10_LHF can transform data order (output order of DFG indices) of the intermediate result sequence $G_{LHF}(k)$, generated by the butterfly PE 10_LHF of the LHFth stage, into bit-reversed order of the DFG indices.

Next, the operation of the first-type butterfly PE 10_S of the Sth stage (S=1, ..., and LHF) will be described. The butterfly PE 10_S performs butterfly operations corresponding to one stage (i.e., N/2 butterfly operations). However, the second stage and stages subsequent thereto in particular, operating order of N/2 butterfly operations per stage is also rearranged in accordance with rearrangement of the output data order of the butterfly PE 10_S−1 at the previous stage. More specifically, the (L−S+1)th bit from the least significant bit (LSB) in binary representation of the counter value C is 0 (i.e., when $b_{L-S+1}(C)=0$), the selector elements 116 and 117 of the selector 115 each select the port #0 side illustrated in FIG. 3. Further, when $b_{L-S+1}(C)=0$, the selector elements 143 and 144 of the selector 142 arranged in the sequence transforming unit 140 each select the port #A side illustrated in FIG. 3, and output input data straight. That is, the selector 142 feeds output data of the delay circuit 141 to the delay circuit 120, and feeds data received at the port SIN2 to the butterfly PE 10_S+1 of the next stage. By this means, the intermediate result data $G_{S-1}(i)$ received in the Cth cycle from the butterfly PE 10_S−1 of the previous stage is fed to the sequence transforming unit 140 without being subjected to a butterfly operation. Note that, the intermediate result data $G_{S-1}(k)$ received in the Cth cycle may not be $G_{S-1}(C)$ because of rearrangement of the output data order (the output order of DFG indices) in the butterfly PE S_1 of the previous stage. The sequence transforming unit 140 delays the intermediate result data $G_{S-1}(k)$ received in the Cth cycle by $2^{S-1}$ cycles with the delay circuit 141, and then outputs the delayed intermediate result data to the delay-circuit 120 through the selector 142.

Meanwhile, when $b_{L-S+1}(C)=1$, the selector elements 116 and 117 of the selector 115 each select the port #1 side illustrated in FIG. 3. The butterfly processor 110 generates data $G_S(k-2^{L-S})$ and $G_S(k)$ by performing a butterfly operation using the intermediate result data $G_{S-1}(k)$ received in the Cth cycle from the butterfly PE 10_S−1 of the previous stage and intermediate result data $G_{S-1}(k-2^{L-S})$ obtained $2^{L-S}$ cycles before and received from the delay circuit 120. Further, one butterfly operation result $G_S(k-2^{L-S})$ is fed to the second input port SIN2 of the sequence transforming unit 140 through the selector element 116. Furthermore, the other butterfly operation result $G_S(k)$ is fed to the first input port SIN1 of the sequence transforming unit 140 through the selector element 117.

When $b_{L-S+1}(C)=1$, the selector elements 143 and 144 of the selector 142 arranged in the sequence transforming unit 140 each change an operation depending on whether $b_S(C)$ is 0 or 1. That is, when $b_{L-S+1}(C)=1$ and $b_S(C)=0$, the selector elements 143 and 144 each select the port #A side illustrated in FIG. 3, and output input data straight. On the other hand, when $b_{L-S+1}(C)=1$ and $b_S(C)=1$, the selector elements 143 and 144 each select the port #B side illustrated in FIG. 3, and cross and output input data. Hence, when $b_{L-S+1}(C)=1$ and $b_S(C)=0$, the sequence transforming unit 140 feeds the intermediate result data $G_S(k-2^{L-S})$, received at the second input port SIN2, to the butterfly PE 10_S+1 of the next stage, and feeds the intermediate result data $G_S(k)$, obtained $2^{S-1}$ cycles before and received from the delay circuit 141, to the delay circuit 120. On the other hand, when $b_{L-S+1}(C)=1$ and $b_S(C)=1$, the sequence transforming unit 140 feeds the intermediate result data $G_S(k-2^{L-S})$, received at the second input port SIN2, to the delay circuit 120, and feeds the intermediate result data $G_S(k)$, obtained $2^{S-1}$ cycles before and received from the delay circuit 141, to the butterfly PE 10_S+1 of the next stage. The butterfly operation result data input to the delay circuit 120 is delayed by $(2^{L-S}-2^{S-1})$ cycles, and is fed to the butterfly PE 10_S+1 of the next stage when $b_{L-S+1}(C)=0$.

The operation of the butterfly PE 10_S described above will be more understood with reference to the following specific examples. FIGS. 4A and 4B are tables illustrating input and output data of the butterfly processor 110 and the sequence transforming unit 140 arranged in the butterfly PE 10_1 of the first stage in an example of N=16 (i.e., L=4). For reference, FIGS. 4A and B also illustrate decimal representation (DEC.) and binary representation (BIN.) of the counter values C, selection ports (#0 or #1) of the selector 115 and selection ports (#A or #B) of the selector 142. In the examples in FIGS. 4A and B, when $b_4(C)=0$, i.e., when counter value C in decimal representation is any one of 0 to 7, a time domain sequence X(C−1) delayed by one cycle by the delay circuit 141 is fed to the delay circuit 820. Further, intermediate result data $G_1(C-7)$ (or $G_1(C+16-7)$) calculated seven cycles before and output from the delay circuit 120 is fed to the butterfly PE 10_2 of the second stage.

Furthermore, in the examples in FIGS. 4A and B, when $b_4(C)=1$ and $b_1(C)=0$, i.e., when the counter value C in decimal representation is 8, 10, 12 or 14, data stored in the delay circuit 141 one cycle before is fed to the delay circuit 120, intermediate result data $G_1(C)$ obtained in the current cycle is newly stored in the delay-circuit 141 of the sequence transforming unit 140, and intermediate result data $G_1(C-8)$ obtained in the current cycle is fed to the butterfly PE 10_2 of the second stage. Still further, when $b_4(C)=1$ and $b_1(C)=1$, i.e., when the counter value C in decimal representation is 9, 11, 13 or 15, intermediate result data $G_1(C-1)$ calculated one cycle before and output from the delay circuit 141 is fed to the butterfly PE 10_2 of the second stage, the intermediate result data $G_1(C)$ obtained in the current cycle is newly stored in the delay circuit 141, and the intermediate result data $G_1(C-8)$ obtained in the current cycle is fed to the delay circuit 120.

As is clear from columns of "SOUT2" in FIGS. 4A and 4B, the above operation changes the output data order of the butterfly PE 10_1 of the first stage such that the intermediate result data $G_1(i)$ whose least significant bit $b_1(i)$ in binary representation of the DFG index i is 1 is output after the intermediate result data $G_1(i)$ whose least significant bit $b_1(i)$ is 0. That is, intermediate result data $G_1(2m+1)$, whose DFG index is odd, is output after intermediate result data $G_1(2m)$, whose DFG index is even.

Subsequently, a specific example of FIG. 5 will be described. FIG. 5 is a table illustrating input and output data of the butterfly processor 110 and the sequence transforming unit 140 arranged in the butterfly PE 10_2 of the second stage in the example of N=16 (i.e., L=4). As illustrated in the column of "BIN2" in FIG. 5, the second input port BIN2 of the butterfly PE 10_2 of the second stage receives the intermediate result data $G_1$ generated by the first stage according to the order illustrated in the columns of "SOUT2" in FIGS. 4A and 4B.

In the example in FIG. 5, when $b_3(C)=0$, i.e., when the counter value C in decimal representation is any one of 0 to 3 and 8 to 11, data delayed by two cycles by the delay circuit 141 is fed to the delay circuit 120, the intermediate result data $G_1$ of the first stage received in the Cth cycle is newly stored in the delay circuit 141, and data delayed by two cycles by the delay circuit 120 is fed to the butterfly PE 10_3 of the third stage.

Further, in the example of FIG. 5, when $b_3(C)=1$ and $b_2(C)=0$, i.e., when the counter value C in decimal representation is 4, 5, 12 or 13, data stored in the delay circuit 141 two cycles before is fed to the delay circuit 120, the intermediate result data $G_2(k)$ obtained in the current cycle is newly stored in the delay circuit 141 of the sequence transforming unit 140, and intermediate result data $G_2(k-4)$ obtained in the current cycle is fed to the butterfly PE 10_3 of the third stage. Furthermore, when $b_3(C)=1$ and $b_2(C)=1$, i.e., when the counter value C in decimal representation is 6, 7, 14 or 15, the intermediate result data $G_2(k)$ calculated two cycles before and output from the delay circuit 141 is fed to the butterfly PE 10_3 of the third stage, the intermediate result data $G_2(k)$ obtained in the current cycle is newly stored in the delay circuit 141, and the intermediate result data $G_2(k-4)$ obtained in the current cycle is fed to the delay circuit 120.

As is understandable from the column of "SOUT2" in FIG. 5, the above operation changes the output data order (output order of DFG indices) of the butterfly PE 10_2 of the second stage such that, in units of eight pieces of output data starting from head output data whose DFG index i is "0", the intermediate result data $G_2(i)$ whose $b_2(i)=1$ is output after the intermediate result data $G_2(i)$ whose $b_2(i)=0$ in the eight pieces of output data. For example, when the eight pieces of intermediate result data whose $b_1(i)=0$ are taken into account, four pieces of data $G_2(2)$, $G_2(10)$, $G_2(6)$ and $G_2(14)$, whose $b_2(i)=1$, are output after four pieces of data $G_2(0)$, $G_2(8)$, $G_2(4)$ and $G_2(12)$, whose $b_2(i)=0$. Further, when the eight pieces of intermediate result data whose $b_1(i)=1$ are taken into account, four pieces of data $G_2(3)$, $G_2(11)$, $G_2(7)$ and $G_2(15)$, whose $b_2(i)=1$, are output after four pieces of data $G_2(1)$, $G_2(9)$, $G_2(5)$ and $G_2(13)$, whose $b_2(i)=0$.

Note that, when N=16, the second stage corresponds to the LHFth stage. Hence, the data order (the output order of DFG indices) of the intermediate result sequence $G_2(k)$ output from the butterfly PE 10_2 of the second stage becomes bit-reversed order of the DFG indices in binary representation.

Figure 6:
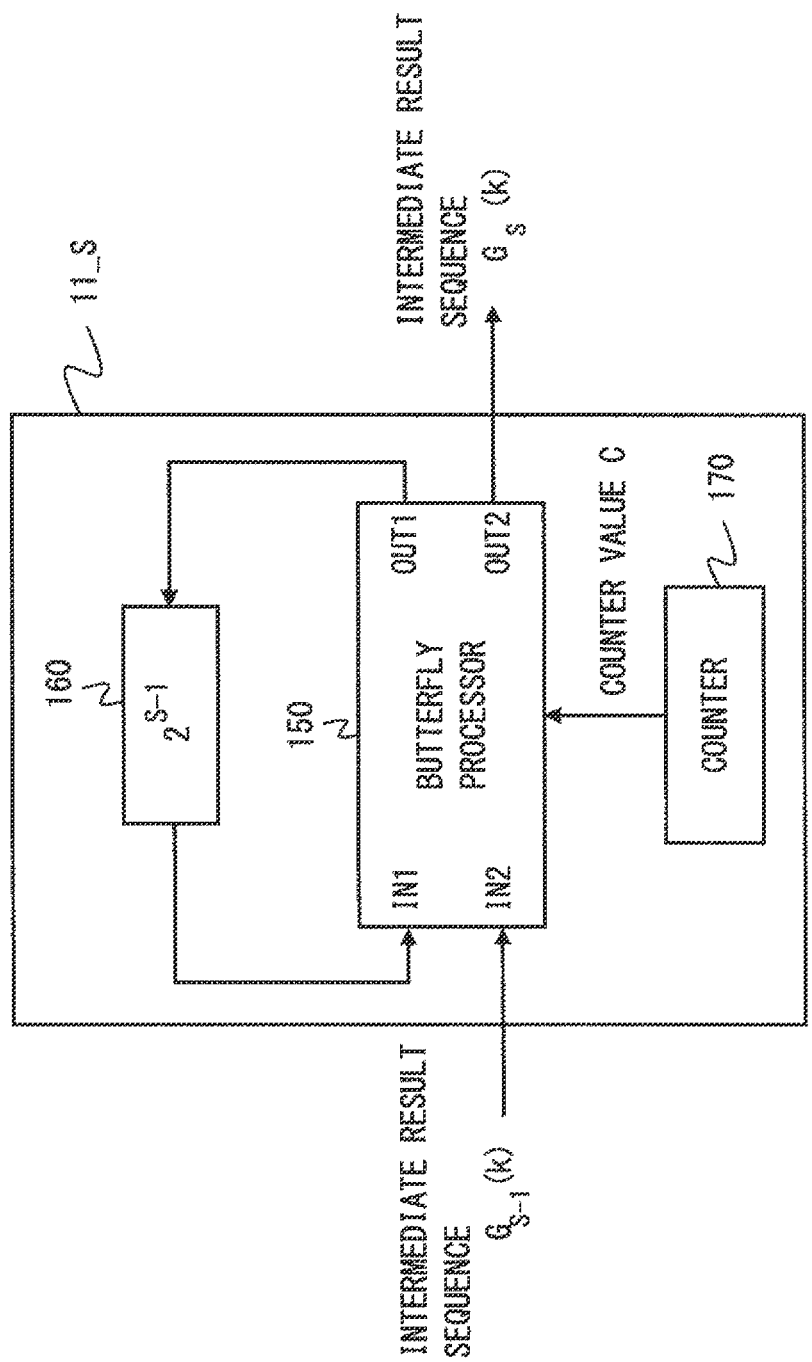
FIG. 6 is a block diagram showing an illustrative configuration of a second-type butterfly PE included in a FFT circuit according an embodiment.

Hereinafter, configurations and operations of the LHS number of second-type butterfly PEs 11 arranged at the posterior section within the pipeline will be described. FIG. 6 is a block diagram illustrating a configuration example of the second-type butterfly PE 11_S of the Sth stage, where S represents an integer equal to or more than LHF+1 and equal to or less than L (i.e., S=LHF+1, . . . and L). The second-type butterfly PE 11_S illustrated in FIG. 6 includes a butterfly processor 150, a delay circuit 160 and a counter 170. The second-type butterfly PE 11_S does not include a circuit block corresponding to the sequence transforming unit 140, and thus the configuration of the second-type butterfly PE 11_S may be the same as the configuration of the butterfly PE 80_S illustrated in FIG. 12. However, as described above, output order (DFG index order) of intermediate result data $G_{LHF}$ generated by the first-type butterfly PEs 10 of the first to LHFth stages has been changed. Hence, to accurately perform butterfly operations at the (LHF+1)th stage and stages subsequent thereto in accordance with the output order (DFG index order) of the intermediate result data $G_{LHF}$ of the LHFth stage, the delay amount of the delay circuit 160 for delay feedback arranged in the second-type butterfly PE 11_S has been changed from $2^{L-S}$ to $2^{S-1}$.

Figure 7:
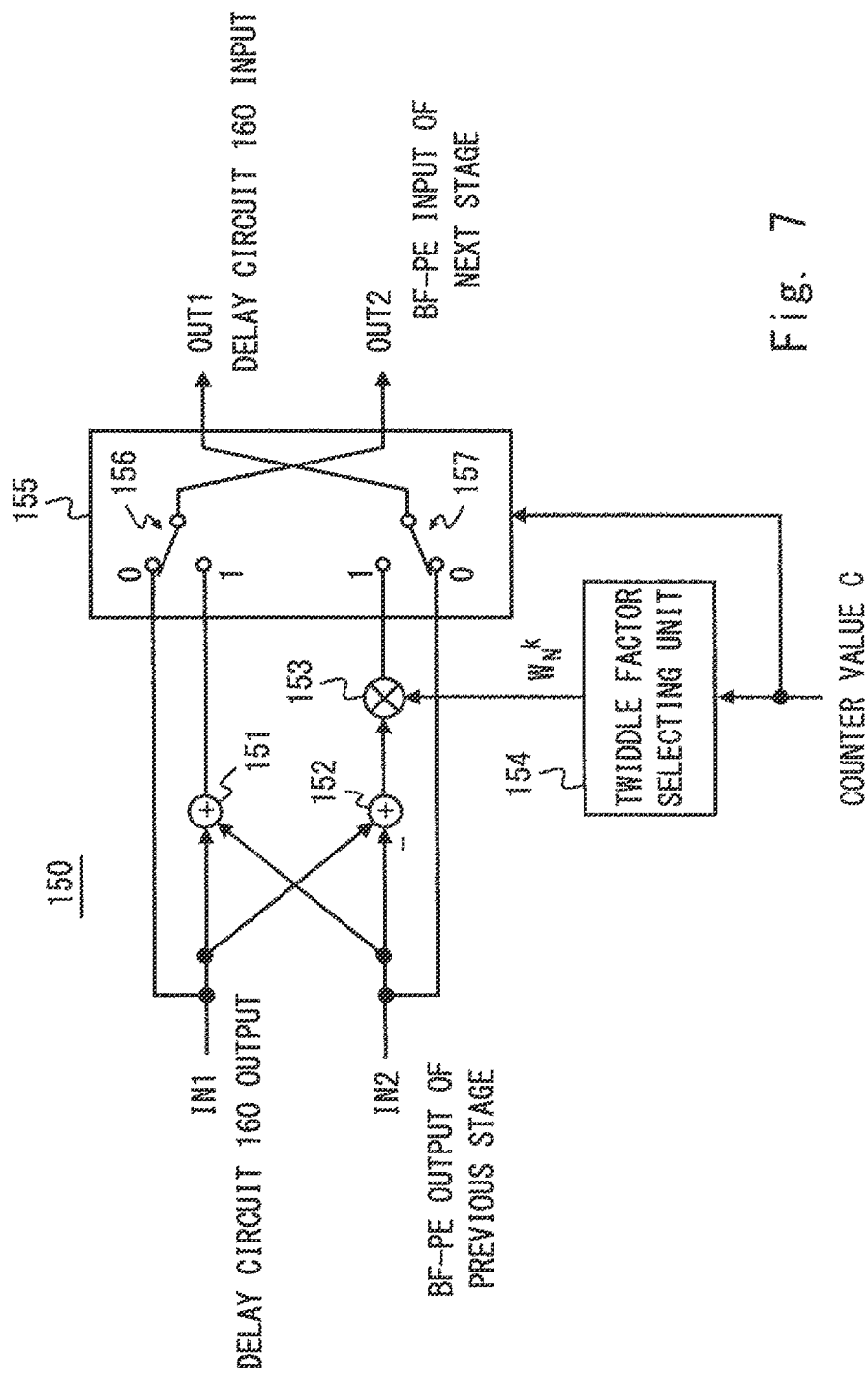
FIG. 7 is a block diagram showing an illustrative configuration of a butterfly processor included in the second-type butterfly PE described in FIG. 5.
Figure 9:
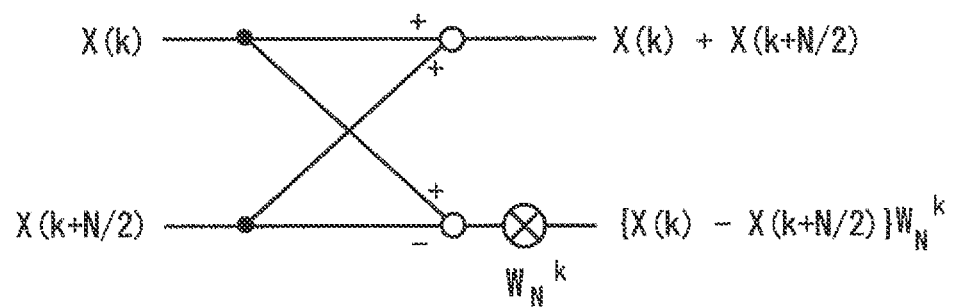
FIG. 9 is a basic flow graph of a butterfly operation of Radix-2 DTF FFT.
Figure 11:
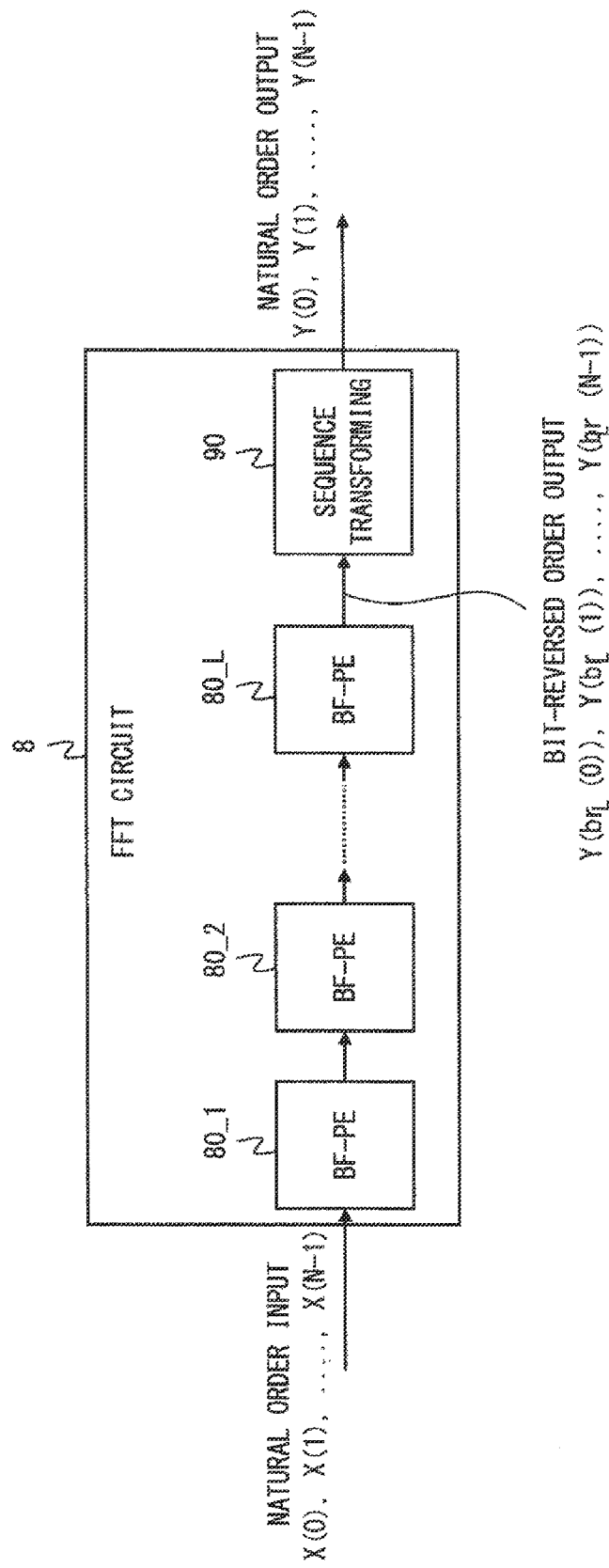
FIG. 11 is a block diagram showing an illustrative configuration of a FFT circuit according to Related Art.

A basic configuration of the butterfly processor 150 is the same as the configuration of the butterfly processor 810 illustrated in FIG. 12. FIG. 7 is a block diagram illustrating a configuration example of the butterfly processor 150. An adder 151, a subtractor 152, a multiplier 153, a twiddle factor selecting unit 154 and a selector 155 (including selector elements 156 and 157) illustrated in FIG. 7 correspond to the adder 811, the subtractor 812, the multiplier 813, the twiddle factor selecting unit 814 and the selector 815 (including the selector elements 816 and 817) illustrated in FIGS. 13A and 13B, respectively. However, order of butterfly operations performed at the Sth stage of the butterfly processor 150 is different from that of the butterfly processor 810, and selection order of the twiddle factors $W_N^k$ in the twiddle factor selecting unit 154 is different from that of the twiddle factor selecting unit 814 accordingly. Further, an operation (selection logic) of the selector 155 according to the counter value C is also different from that of the selector 815.

A configuration and an operation of the counter 170 may be the same as those of the counter 830 illustrated in FIG. 12. That is, the counter 170 is an L-bit counter, and is reset to 0 at a timing at which the output data $G_{S-1}(0)$ whose DFG index is "0" is input from the butterfly PE of the previous stage. The counter 170 supplies the counter value C to the butterfly processor 150.

Next, an operation of the second-type butterfly PE 11_S of the Sth stage (S=LHF+1, . . . , and L) will be described. The butterfly PE 11_S performs N/2 butterfly operations in accordance with the output data order of the LHFth stage (output order of DFG indices), i.e., in accordance with the bit-reversed order of the DFG indices in binary-representation, and outputs the output sequence $G_S(k)$ in this DFG index order as is. More specifically, when the Sth bit from the least significant bit (LSB) in binary representation of the counter value C is 0 (i.e., when $b_S(C)=0$), the selector elements 156 and 157 of the selector 155 each select the port #0 side illustrated in FIG. 7. By this means, the intermediate result data $G_{S-1}(k)$ received in the Cth cycle from the butterfly PE of the previous stage is fed to the delay circuit 160 without being subjected to butterfly operations.

Meanwhile, when $b_S(C)=1$, the selector elements 156 and 157 of the selector 115 each select the port #1 side illustrated in FIG. 7. The butterfly processor 150 generates data $G_S(k-2^{L-S})$ and $G_S(k)$ by performing a butterfly operation using the intermediate result data $G_{S-1}(k)$ received in the Cth cycle from the butterfly PE of the previous stage and the intermediate result data $G_{S-1}(k-2^{L-S})$ obtained by $2^{S-1}$ cycles before and received from the delay circuit 120. Further, one butterfly operation result $G_{S-1}(k-2^{L-S})$ is fed to the butterfly PE 11_S+1 of the next stage through the selector element 156. Furthermore, the other butterfly operation result $G_S(k)$ is fed to the delay circuit 160 through the selector element 157. The butterfly operation result $G_S(k)$ input to the delay circuit 160 is delayed by $2^{S-1}$ cycles, and is fed to the butterfly PE 11_S+1 of the next stage when $b_S(C)=0$.

FIG. 8 is a table illustrating input and output data of the butterfly processor 150 arranged in the second-type butterfly PE 11_3 of the third stage in the example of N=16 (i.e., L=4). Hence, as illustrated in the column of "IN2" in FIG. 8, the second input port IN2 of the butterfly PE 11_3 of the third stage receives the intermediate result data $G_2$ generated by the second stage according to the order illustrated in the column of "SOUT2" in FIG. 5 (i.e., in the bit-reversed order of DFG indices). In the example in FIG. 8, when $b_3(C)=1$, i.e., when the counter value C in decimal representation is any one of 4 to 6 and 12 to 15, intermediate result data $G_S(k)$ obtained in the current cycle is fed to the delay circuit 160, and intermediate result data $G_3(k-4)$ obtained in the current cycle is fed to the butterfly PE 11_4 of the fourth stage. Meanwhile, when $b_3(C)=0$, i.e., when the counter value C in decimal representation is any one of 0 to 3 and 8 to 11, the intermediate result data $G_2$ of the second stage generated in the current cycle is fed to the delay circuit 160, and the intermediate result data $G_3(k)$ calculated four cycles before and received from the delay circuit 160 is fed to the butterfly PE 11_4 of the fourth stage.

As is understandable from the column of "OUT2" in FIG. 8, the output order of DFG indices in output data generated by the butterfly PE 11_3 at the third stage is the same bit-reversed order of the DFG indices in binary representation as that of the input data.

Hereinafter, the delay amount of the pipeline FFT circuit 1 according to the present embodiment will be discussed. The delay amount of the first-type butterfly PE 10_S, including a delay amount of the delay circuit 120 and a delay amount of the delay circuit 141 in the sequence transforming unit 140, is expressed by following formula (7), and a sum of the delay amounts of the LHF number of first-type butterfly PEs 10 is expressed by following formula (8).

$$(2^{L-S} - 2^{S-1}) + 2^{S-1} = 2^{L-S} \tag{7}$$

$$\sum_{S=1}^{LHF} 2^{L-S} \tag{8}$$

Further, a sum of delay amounts of the LHS number of second-type butterfly PEs 11 is expressed by following formula (9).

$$\sum_{S=LHF+1}^{L} 2^{S-1} = \sum_{S=1}^{LHS} 2^{L-S} \tag{9}$$

Thus, the total delay amount of the FFT circuit 1 is expressed by a sum of formulae (8) and (9), i.e., by following formula (10).

$$\sum_{S=1}^{LHF} 2^{S-1} = \sum_{S=1}^{LHS} 2^{L-S} \tag{10}$$

The total delay amount of the FFT circuit 1 expressed by formula (10) is smaller than the total delay amount of the FFT circuit 8 expressed by formula (4). When, for example, N=16 (L=4), while the total delay amount of the FFT circuit 8 is 31 cycles, the total delay amount of the FFT circuit 1 according to the present embodiment is only 24 cycles.

As described above, the FFT circuit 1 according to the present embodiment includes the FFT pipeline having Radix-2 DIF SDF architecture in which the LHF number of first-type butterfly PEs are connected with the LHS number of second-type butterfly PEs 11. Further, each of the first-type butterfly PEs 10 includes a sequence transforming mechanism using small scale hardware. Consequently, the first-type butterfly PEs 10_1 to 10_LHF can sequentially switch the data order of the intermediate result sequence $G_S(k)$, and thereby the LHF number of butterfly PEs 10 can transform data order (output order of DFG indices) of the intermediate result sequence $G_{LHF}(k)$, output from the butterfly PE 10_LHF of the LHFth stage, into bit-reversed order of the DFG indices in binary representation.

More specifically, the butterfly PE 10_S of the Sth stage (S=1, . . . , and LHF) rearranges the output data order such that, in units of $N/(2^{S-1})$ pieces of output data starting from head output data whose DFG index i is "0", the intermediate result data $G_S(i)$ whose $b_S(i)=1$ is output after the intermediate result data $G_S(i)$ whose $b_S(i)=0$ in the $N/(2^{S-1})$ pieces of output data.

Meanwhile, each of the second-type butterfly PEs 11 arranged at the (LHF+1)th stage to the Lth stage in the posterior section is configured to output the output sequence $G_S(k)$ while keeping the DFG index order of input data thereof, i.e., in bit-reversed order of the DFG indices.

According to the above configuration, the FFT circuit 1 according to the present embodiment can output an output sequence in natural order based on an input sequence in natural order, and reduce the total delay amount as expressed in formula (9).

OTHER EMBODIMENTS

The FFT circuit 1 described in the first embodiment may perform FFT processing on a data sequence transmitted or received through a transmission line. The FFT circuit 1 is suitable for, for example, an OFDM receiver (e.g., a communication terminal of an LTE system, a wireless LAN device and a digital television broadcast receiver). That is, the FFT circuit 1 may execute FFT processing for extracting a complex symbol sequence from a received OFDM signal in an OFDM receiver.

Further, the FFT circuit 1 described in the first embodiment may be implemented on an IC (Integrated Circuit) chip. The FFT circuit 1 has a little total delay amount and can reduce circuit scales of delay-circuits and, consequently, reduce a circuit scale of the IC chip.

Further, the FFT circuit 1 having Radix-2 DIF SDF architecture has been described with the first embodiment. However, the technical idea described in the first embodiment is also applicable to, for example, FFT circuits having other SDF architectures. For example, the technical idea described in the first embodiment may also be applicable to an FFT circuit having Radix-2 DIT SDF, Radix-$2^2$ DIF SDF or Radix-$2^\pi$ DIT SDF architecture. Radix-$2^\pi$ is, for example, Radix-$2^2$, Radix-$2^3$ and Radix-$2^4$.

Furthermore, the embodiments stated above are merely examples of application of the technical ideas obtained by the present inventor. Needless to say, these technical ideas are not limited to those described in the above embodiments and the reference embodiment, and may be changed in various ways.

The technical ideas described in the above embodiments may be described, for example, as shown in the following Supplementary notes.

(Supplementary Note 1)

A Fast Fourier Transform (FFT) circuit including:

a pipeline in which L number of butterfly operational elements each having Single-path Delay Feedback (SDF) architecture are connected with each other, in which the L number of butterfly operational elements include LHF number of first butterfly operational elements corresponding to a first stage to an LHFth stage, and LHS number of second butterfly operational elements corresponding to a (LHF+1)th stage to an Lth stage, where LHF+LHS=L, and each of the LHF number of first butterfly operational elements is configured to rearrange output data order such that, in units of $N/(2^{S-1})$ pieces of output data starting from head output data whose Data Flow Graph (DFG) index i is "0", intermediate result data $G_S(i)$ whose $b_S(i)$ is 1 is output after intermediate result data $G_S(i)$ whose $b_S(i)$ is 0 in the $N/(2^{S-1})$ pieces of the output data, where N represents the number of FFT points, S represents an integer indicating a stage number equal to or more than 1 and equal to or less than LHF, and $b_S(i)$ represents the Sth bit from the least significant bit in binary representation of the DFG index i.

(Supplementary Note 2)

The FFT circuit according to Supplementary note 1, in which the LHF number of first butterfly operational elements operate so as to transform data order of an intermediate result sequence generated by the first butterfly operational element of the LHFth stage into bit-reversed order of the DFG index by sequentially rearranging data order of an intermediate result sequence generated at each stage.

(Supplementary Note 3)

The FFT circuit according to Supplementary note 1 or 2, in which the LHS number of second butterfly operational elements are configured to output a frequency domain sequence in natural order from the second butterfly operational element of the Lth stage by keeping the data order of the intermediate result sequence generated at the LHFth stage.

(Supplementary Note 4)

The FFT circuit according to any one of Supplementary notes 1 to 3, in which each of the LHF number of first butterfly operational elements includes a first butterfly processor which, outputs data to a data path and a feedback path, a first delay circuit which is arranged in the feedback path, and a sequence transform circuit.

in which the sequence transform circuit includes a second delay circuit which is arranged in the feedback path between an output of the butterfly processor and an input of the first delay circuit, and a selector which switches a signal path between the data path and the feedback path at between the output of the second delay circuit and the input of the first delay circuit.

(Supplementary Note 5)

The FFT circuit according to Supplementary note 4, in which the first delay circuit provides a delay amount ($2^{L-S}-2^{S-1}$), and the second delay circuit provides a delay amount $2^{S-1}$.

(Supplementary Note 6)

The FFT circuit according to Supplementary note 4 or 5, in which each of the LHS number of second butterfly operational element includes a second butterfly processor, and a third delay circuit which is arranged in a feedback path of the second butterfly processor and provides a delay amount $2^{S-1}$.

(Supplementary Note 7)

The FFT circuit according to any one of Supplementary notes 1 to 6, wherein the pipeline is a Radix-2 pipeline or a Radix-$2^\pi$ pipeline.

(Supplementary Note 8)

The FFT circuit according to any one of Supplementary notes 1 to 7, in which the FFT circuit performs FFT processing on a data sequence transmitted or received through a transmission line.

(Supplementary Note 9)

The FFT circuit according to any one of Supplementary notes 1 to 8, in which the FFT circuit performs FFT processing for extracting a complex symbol sequence from a received Orthogonal Frequency Division Multiplexing (OFDM) signal.

(Supplementary Note 10)

The FFT circuit according to any one of Supplementary notes 1 to 9, in which the FFT circuit is implemented on an Integrated Circuit (IC) chip.

(Supplementary Note 11)

A Fast Fourier Transform (FFT) circuit including:

a pipeline in which L number of butterfly operational elements each having Single-path Delay Feedback (SDF) architecture are connected with each other, in which the L number of butterfly operational elements include LHF number of first butterfly operational elements corresponding to a first stage to an LHFth stage, and LHS number of second butterfly operational elements corresponding to a (LHF+1)th stage to an Lth stage, where LHF+LHS=L, the LHF number of first butterfly operational elements are configured to transform data order of an intermediate result sequence generated by the first butterfly operational element of the LHFth stage into bit-reversed order of Data Flow Graph (DFG) index by sequentially rearranging data order of an intermediate result sequence generated at each stage, and the LHS number of second butterfly operational elements are configured to output a frequency domain sequence in natural order from the second butterfly operational element of the Lth stage by keeping the data order of the intermediate result sequence generated at the LHFth stage.

(Supplementary Note 12)

The FFT circuit according to Supplementary note 11, in which each of the LHF number of first butterfly operational elements operates to rearrange output data order such that, in units of $N/(2^{S-1})$ pieces of output data starting from head output data whose Data Flow Graph (DFG) index i is "0", intermediate result data $G_S(i)$ whose $b_S(i)$ is 1 is output after intermediate result data $G_S(i)$ whose $b_S(i)$ is 0 in the $N/(2^{S-1})$ pieces of output data, where N represents the number of FFT points, S represents an integer indicating a stage number equal to or more than 1 and equal to or less than LHF, and $b_S(i)$ represents the Sth bit from the least significant bit in binary representation of the DFG index i.

(Supplementary Note 13)

The FFT circuit according to Supplementary note 11 or 12, in which each of the LHF number of first butterfly operational elements includes a first butterfly processor which outputs data to a data path and a feedback path, a first delay circuit which is arranged in the feedback path, and a sequence transform circuit, in which the sequence transform circuit includes a second delay circuit which is arranged in the feedback path between an output of the butterfly processor and an input of the first delay circuit, and a selector which switches a signal path between the data path and the feedback path at between the output of the second delay circuit and the input of the first delay circuit, where S represents an integer indicating a stage number equal to or more than 1 and equal to or less than LHF.

(Supplementary note 14)

A Fast Fourier Transform (FFT) circuit including:

a pipeline in which L number of butterfly operational elements each having Single-path Delay Feedback (SDF) architecture are connected with each other, in which the L number of butterfly operational elements include LHF number of first butterfly operational elements corresponding to a first stage to an LHFth stage, and LHS number of second butterfly operational elements corresponding to a (LHF+1)th stage to an Lth stage, where LHF+LHS=L, and each of the LHF number of first butterfly operational elements includes a first butterfly processor which outputs data to a data path and a feedback path, a first delay circuit which is arranged in the feedback path, and a sequence transform circuit, in which the sequence transform circuit includes a second delay circuit which is arranged in the feedback path between an output of the butterfly processor and an input of the first delay circuit, and a selector which switches a signal path between the data path and the feedback path at between the output of the second delay circuit and the input of the first delay circuit, where S represents an integer equal to or more than 1 and equal to less than LHF indicating a stage number.

(Supplementary Note 15)

The FFT circuit according to Supplementary note 14, in which the first delay circuit provides a delay amount $(2^{S-S}-2^{S-1})$, and the second delay circuit provides a delay amount $2^{S-1}$.

(Supplementary Note 16)

The FFT circuit according to Supplementary note 14 or 15, in which each of the LHS number of second butterfly operational element includes a second butterfly processor, and a third delay circuit which is arranged in a feedback path of the second butterfly processor and provides a delay amount $2^{S-1}$.

(Supplementary Note 17)

A method for performing Fast Fourier Transform (FFT) using a pipeline in which L number of butterfly operational elements each having Single-path Delay Feedback (SDF) architecture are connected with each other, the method including:

by LHF number of butterfly operational elements corresponding to a first stage to an LHFth stage, rearranging output data order such that, in units of $N/(2^{S-1})$ pieces of output data starting from head output data whose Data Flow Graph (DFG) index i is "0", intermediate result data $G_S(i)$ whose $b_S(i)$ is 1 is output after intermediate result data $G_S(i)$ whose $b_S(i)$ is 0 in the $N/(2^{S-1})$ pieces of the output data, where N represents the number of FFT points, S represents an integer indicating a stage number equal to or more than 1 and equal to or less than LHF, and $b_S(i)$ represents the Sth bit from the least significant bit in binary representation of the DFG index i.

(Supplementary Note 18)

A method for performing Fast Fourier Transform (FFT) using a pipeline in which L number of butterfly operational elements each having Single-path Delay Feedback (SDF) architecture are connected with each other, the L number of butterfly operational elements including LHF number of first butterfly operational elements corresponding to a first stage to an LHFth stage, and LHS number of second butterfly operational elements corresponding to a (LHF+1)th stage to an Lth stage, where LHF+LHS=L, the method including:

by the LHF number of first butterfly operational elements, transforming data order of an intermediate result sequence generated by the first butterfly operational element of the LHFth stage into bit-reversed order of Data Flow Graph DFG) index by sequentially rearranging data order of an intermediate result sequence generated at each stage; and by the LHS number of second butterfly operational elements, outputting a frequency domain sequence in natural order from the second butterfly operational element of the Lth stage by keeping the data order of the intermediate result sequence generated at the LHFth stage.

This application is based upon and claims the benefit of priority from Japanese Patent Application No. 2012-159353, filed on Jul. 18, 2012, the disclosure of which is incorporated herein in its entirety by reference.

REFERENCE SIGNS LIST

1 FFT (Fast Fourier Transform) CIRCUIT
10 FIRST-TYPE BUTTERFLY PE (Processing Element)
11 SECOND-TYPE BUTTERFLY PE (Processing Element)
110 BUTTERFLY PROCESSOR
111 ADDER
112 SUBTRACTOR
113 MULTIPLIER
114 TWIDDLE FACTOR SELECTING UNIT
115 SELECTOR
116 SELECTOR ELEMENT
117 SELECTOR ELEMENT
120 DELAY CIRCUIT
130 COUNTER
140 SEQUENCE TRANSFORMING UNIT
141 DELAY CIRCUIT
142 SELECTOR
143 SELECTOR ELEMENT
144 SELECTOR ELEMENT
150 BUTTERFLY PROCESSOR
151 ADDER
152 SUBTRACTOR
153 MULTIPLIER
154 TWIDDLE FACTOR SELECTING UNIT
155 SELECTOR
156 SELECTOR ELEMENT
157 SELECTOR ELEMENT
160 DELAY CIRCUIT
170 COUNTER

The invention claimed is:

1. A Fast Fourier Transform, FFT, circuit comprising:
a pipeline in which L number of butterfly operational elements each having Single-path Delay Feedback, SDF, architecture are connected with each other, wherein
the L number of butterfly operational elements include LHF number of first butterfly operational elements corresponding to a first stage to an LHFth stage, and LHS number of second butterfly operational elements corresponding to a (LHF+1)th stage to an Lth stage, where LHF+LHS=L, and
each of the LHF number of first butterfly operational elements is configured to rearrange output data order such that, in units of $N/(2^{H-1})$ pieces of output data starting from head output data whose Data Flow Graph, DFG, index i is "0", intermediate result data $G_S(i)$ whose $b_S(i)$ is 1 is output after intermediate result data $G_S(i)$ whose $b_S(i)$ is 0 in the $N/(2^{S-1})$ pieces of the output data, where N represents the number of FFT points, S represents an integer indicating a stage number equal to or more than 1 and equal to or less than LHF, and $b_S(i)$ represents the Sth bit from the least significant bit in binary representation of the DFG index i.

2. The FFT circuit according to claim 1, wherein the LHF number of first butterfly operational elements operate so as to transform data order of an intermediate result sequence generated by the first butterfly operational element of the LHFth stage into bit-reversed order of the DFG index by sequentially rearranging data order of an intermediate result sequence generated at each stage.

3. The FFT circuit according to claim 2, wherein the LHS number of second butterfly operational elements are configured to output a frequency domain sequence in natural order from the second butterfly operational element of the Lth stage by keeping the data order of the intermediate result sequence generated at the LHFth stage.

4. The FFT circuit according to claim 2, wherein each of the LHF number of first butterfly operational elements includes a first butterfly processor which outputs data to a data path and a feedback path, a first delay circuit which is arranged in the feedback path, and a sequence transform circuit,
wherein the sequence transform circuit includes a second delay circuit which is arranged in the feedback path between an output of the butterfly processor and an input of the first delay circuit, and a selector which switches a signal path between the data path and the feedback path at between the output of the second delay circuit and the input of the first delay circuit.

5. The FFT circuit according to claim 2, wherein the pipeline is a Radix-2 pipeline or a Radix-$2^n$ pipeline.

6. The FFT circuit according to claim 1, wherein the LHS number of second butterfly operational elements are configured to output a frequency domain sequence in natural order from the second butterfly operational element of the Lth stage by keeping the data order of the intermediate result sequence generated at the LHFth stage.

7. The FFT circuit according to claim 6, wherein each of the LHF number of first butterfly operational elements includes a first butterfly processor which outputs data to a data path and a feedback path, a first delay circuit which is arranged in the feedback path, and a sequence transform circuit,
wherein the sequence transform circuit includes a second delay circuit which is arranged in the feedback path between an output of the butterfly processor and an input of the first delay circuit, and a selector which switches a signal path between the data path and the feedback path at between the output of the second delay circuit and the input of the first delay circuit.

8. The FFT circuit according to claim 6, wherein the pipeline is a Radix-2 pipeline or a Radix-$2^n$ pipeline.

9. The FFT circuit according to claim 1, wherein each of the LHF number of first butterfly operational elements includes a first butterfly processor which outputs data to a data path and a feedback path, a first delay circuit which is arranged in the feedback path, and a sequence transform circuit,
wherein the sequence transform circuit includes a second delay circuit which is arranged in the feedback path between an output of the butterfly processor and an input of the first delay circuit, and a selector which switches a signal path between the data path and the feedback path at between the output of the second delay circuit and the input of the first delay circuit.

10. The FFT circuit according to claim 9, wherein
the first delay circuit provides a delay amount $(2^{L-3}-2^{S-1})$, and
the second delay circuit provides a delay amount $2^{S-1}$.

11. The FFT circuit according to claim 10, wherein each of the LHS number of second butterfly operational element includes a second butterfly processor, and a third delay circuit which is arranged in a feedback path of the second butterfly processor and provides a delay amount $2^{S-1}$.

12. The FFT circuit according to claim 9, wherein each of the LHS number of second butterfly operational element includes a second butterfly processor, and a third delay circuit which is arranged in a feedback path of the second butterfly processor and provides a delay amount $2^{S-1}$.

13. The FFT circuit according to claim 1, wherein the pipeline is a Radix-2 pipeline or a Radix-$2^n$ pipeline.

14. The FFT circuit according to claim 1, wherein the FFT circuit performs FFT processing on a data sequence transmitted or received through a transmission line.

15. The FFT circuit according to claim 1, wherein the FFT circuit performs FFT processing for extracting a complex symbol sequence from a received Orthogonal Frequency Division Multiplexing (OFDM) signal.

16. The FFT circuit according to claim 1, wherein the FFT circuit is implemented on an integrated Circuit (IC) chip.

17. A Fast Fourier Transform, FFT, circuit comprising:
a pipeline in which L number of butterfly operational elements each having Single-path Delay Feedback, SDF, architecture are connected with each other, wherein
the L number of butterfly operational elements include LHF number of first butterfly operational elements corresponding to a first stage to an LHFth stage, and LHS number of second butterfly operational elements corresponding to a (LHF+1)th stage to an Lth stage, where LHF+LHS=L,
the LHF number of first butterfly operational elements are configured to transform data order of an intermediate result sequence generated by the first butterfly operational element of the LHFth stage into bit-reversed order of Data Flow Graph, DFG, index by sequentially rearranging data order of an intermediate result sequence generated at each stage, and
the LHS number of second butterfly operational elements are configured to output a frequency domain sequence in natural order from the second butterfly operational element of the Lth stage by keeping the data order of the intermediate result sequence generated at the LHFth stage.

18. The FFT circuit according to claim 17, wherein each of the LHF number of first butterfly operational elements operates to rearrange output data order such that, in units of $N/(2^{S-1})$ pieces of output data starting from head output data whose Data Flow Graph (DFG) index i is "0", intermediate result data $G_S(i)$ whose $b_S(i)$ is 1 is output after intermediate result data $G_S(i)$ whose $b_S(i)$ is 0 in the $N/(2^{S-1})$ pieces of output data, where N represents the number of FFT points, S represents an integer indicating a stage number equal to or more than 1 and equal to or less than LHF, and $b_S(i)$ represents the Sth bit from the least significant bit in binary representation of the DFG index i.

19. The FFT circuit according to claim 17, wherein each of the LHF number of first butterfly operational elements includes a first butterfly processor which outputs data to a data path and a feedback path, a first delay circuit which is arranged in the feedback path, and a sequence transform circuit,
wherein the sequence transform circuit includes a second delay circuit which is arranged in the feedback path between an output of the butterfly processor and an input of the first delay circuit, and a selector which switches a signal path between the data path and the feedback path at between the output of the second delay circuit and the input of the first delay circuit.

20. A method for performing Fast Fourier Transform, FFT, using a pipeline in which L number of butterfly operational elements each having Single-path Delay Feedback, SDF, architecture are connected with each other, the method comprising:
by LHF number of butterfly operational elements corresponding to a first stage to an LHFth stage, rearranging output data order such that, in units of $N/(2^{S-1})$ pieces of output data starting from head output data whose Data Flow Graph, DFG, index i is "0", intermediate result data $G_S(i)$ whose $b_S(i)$ is 1 is output after intermediate result data $G_S(i)$ whose $b_S(i)$ is 0 in the $N/(2^{S-1})$ pieces of the output data, where N represents the number of FFT points, S represents an integer indicating a stage number equal, to or more than 1 and equal to or less than LHF, and $b_S(i)$ represents the Sth bit from the least significant bit in binary representation of the DFG index i.

* * * * *